(12) United States Patent
Zhang et al.

(10) Patent No.: US 12,395,768 B1
(45) Date of Patent: Aug. 19, 2025

(54) REDUNDANCY LINKS, RESILIENCY ARCHITECTURES, AND PROTECTION METHODS FOR PASSIVE OPTICAL NETWORKS

(71) Applicant: CABLE TELEVISION LABORATORIES, INC., Louisville, CO (US)

(72) Inventors: Haipeng Zhang, Broomfield, CO (US); Luis Alberto Campos, Superior, CO (US); Mu Xu, Broomfield, CO (US); Zhensheng Jia, Superior, CO (US); Junwen Zhang, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 260 days.

(21) Appl. No.: 17/952,022

(22) Filed: Sep. 23, 2022

Related U.S. Application Data

(60) Provisional application No. 63/247,437, filed on Sep. 23, 2021, provisional application No. 63/247,879, (Continued)

(51) Int. Cl.
*H04Q 11/00* (2006.01)
*H04B 10/27* (2013.01)
*H04B 10/61* (2013.01)

(52) U.S. Cl.
CPC ......... *H04Q 11/0062* (2013.01); *H04B 10/27* (2013.01); *H04B 10/614* (2013.01); *H04Q 2011/0081* (2013.01)

(58) Field of Classification Search
CPC ... H04B 10/27; H04B 10/614; H04Q 11/0062
(Continued)

(56) References Cited

U.S. PATENT DOCUMENTS 7,561,799 B2 * 7/2009 Togawa ............... G02B 6/3562
                                                                       398/19
10,476,587 B2 * 11/2019 Xie ...................... H04B 10/038
(Continued)

FOREIGN PATENT DOCUMENTS

CN       201674613 U  * 12/2010
CN       103281622 A  *  9/2013
(Continued)

OTHER PUBLICATIONS

Suzuki et al; Ultra-high-extinction-ratio 2X2 silicon optical switch with variable splitter; Apr. 2015; Optical society of America; pp. 1-7. (Year: 2015).*

*Primary Examiner* — Amritbir K Sandhu
(74) *Attorney, Agent, or Firm* — Cozen O'Connor

(57) ABSTRACT

A redundancy link includes a first optical splitter and a second optical splitter. The first optical splitter includes (i) a first hub-side port that optically couples to a first optical line terminal, a first hub-side failover-mode port, (iii) a first plurality of node-side splitter-ports each optically coupled to the first hub-side port and the first hub-side failover-mode port, (iii) a first failover-mode port coupled to the first hub-side port. The second optical splitter includes (i) a second hub-side port that optically couples to a second optical line terminal, a second hub-side failover-mode port optically coupled to the first failover-mode port, (iii) a second plurality of node-side splitter-ports each optically coupled to the second hub-side port and the second hub-side failover-mode port, (iii) a second failover-mode port coupled to the second hub-side port.

23 Claims, 24 Drawing Sheets

Related U.S. Application Data filed on Sep. 24, 2021, provisional application No. 63/278,988, filed on Nov. 12, 2021.

(58) Field of Classification Search
USPC .............................................................. 398/5
See application file for complete search history.

(56) References Cited

U.S. PATENT DOCUMENTS

| | | | |
|---|---|---|---|
| 10,511,401 B2 * | 12/2019 | Jones .................. | H04J 14/0212 |
| 11,245,970 B1 * | 2/2022 | Jia ..................... | H04Q 11/0005 |
| 11,705,694 B1 * | 7/2023 | Zhang ................... | H01S 5/141 |
| | | | 372/44.01 |
| 2002/0197004 A1 * | 12/2002 | Feinberg ............. | H04J 14/0294 |
| | | | 385/24 |
| 2004/0208551 A1 * | 10/2004 | Weverka ............. | H04J 14/0204 |
| | | | 385/17 |
| 2010/0098407 A1 * | 4/2010 | Goswami ............. | H04B 10/272 |
| | | | 398/1 |
| 2014/0050471 A1 * | 2/2014 | Bernasconi .......... | H04B 10/032 |
| | | | 398/2 |
| 2016/0112303 A1 * | 4/2016 | Yoo ........................ | H04L 45/24 |
| | | | 398/45 |

FOREIGN PATENT DOCUMENTS

| | | | | |
|---|---|---|---|---|
| CN | 102130718 B | * | 8/2015 | |
| CN | 112153496 A | * | 12/2020 | ......... H04Q 11/0062 |
| EP | 3462643 A2 | * | 4/2019 | ......... G02B 6/29395 |
| GB | 2547662 A | * | 8/2017 | ........... H04B 10/032 |

\* cited by examiner

REDUNDANCY LINKS, RESILIENCY ARCHITECTURES, AND PROTECTION METHODS FOR PASSIVE OPTICAL NETWORKS

CROSS-REFERENCE TO RELATED APPLICATIONS

This application claims the benefit of U.S. Provisional Application No. 63/247,437, filed Sep. 23, 2021, U.S. Provisional Application No. 63/247,879, filed Sep. 24, 2021, and U.S. Provisional Application No. 63/278,988 filed Nov. 12, 2021. The disclosure of each of these applications is incorporated herein by reference in its entirety.

BACKGROUND

Today, the cable industry is rolling out plans for providing 10-gigabit-per-second symmetrical speeds, lower latencies, enhanced reliability, and better security to the end users in a scalable manner. A suite of key advances in cable and optical technologies will enable such a 10G platform, including deeper fiber penetration, flexible and modular intelligent fiber nodes, spectrum expansion and DOCSIS® 4.0 technologies, all-IP services, and multi-layer network function virtualization.

FIG. 1 shows a schematic of a distributed access architecture (DAA) 100 designed to deliver high-speed data and video to support a variety of services. DAA 100 includes a primary headend 110 (depending on the network architecture also known as, for example, a core, head office, primary distribution center, etc.), an optical fiber ring network 120, a secondary hub 130, optical fiber link 140, aggregation nodes 150, drop fibers 160, child nodes 170, and connections 180 (such as coaxial cables, fiber line, twisted pair, and could be a wireless connection such as a directional or non-directional wireless signal). Each optical fiber link 140 may be a feeder fiber. In embodiments, optical fiber ring network 120 is one or more of a mobile network and a cellular network, such as 3G, 4G, 5G, and successor generations, or any cellular network that complies with standards set by the 3$^{rd}$ Generation Partnership Project (3GPP). Other embodiments may support communications systems such as ground portions of satellite systems such as geostationary orbit (GEO), medium Earth orbit (MEO), and low Earth orbit (LEO) satellite systems.

Headend 110 may serve as the primary signal/content sources from satellite/microwave antennas, core/metro networks, and due to its central location may also serve as the interconnection points with other service providers. Typically, headend 110 is connected to a few hubs (e.g., secondary hubs 130) with optical fiber ring network 120. Because of the fundamental shift from centralized architecture to distributed architecture, where the RF is all generated at a Remote PHY Device (RPD) or Remote MAC/PHY Device (RMD) for more Service Group (SG) with fewer customers each, an aggregation node 150 is needed for multiple child nodes for residential, business, and cellular backhaul services. The distance between secondary hub 130 and aggregation node 150 may be less than 80 km, and the distance from the aggregation node 150 to each child node 170 may be less than 3 km.

Available digital options connecting the hub 130, aggregation nodes 150, and child nodes 170 include intensity-modulation and direct-detection (IM-DD) technology and coherent optical solutions. In IM-DD case, multiple 10G optical links can be multiplexed by using DWDM, with each aggregation node 150 being an optical pair of Mux/Demux. This technology is a mature technology and can be an initial approach. Coherent optics, on the other hand, can significantly increase the spectral efficiency and address the IM-DD limitation on the capacity scaling challenge through enabling a capacity of 100 Gbps or higher on a single wavelength at a much longer transmission distance.

This common transport platform operates over a typical point-to-multipoint (P2MP) topology, also called a tree or trunk-and-branch topology. In such network, there are two common ways for digital optical technology selection based on the principle of splitting the signal. The two methods are called active optical networks (AON) or passive optical networks (PON). In an AON approach, hub 130 would send a single 100-Gbps or 200-Gbps coherent optical signal to an aggregation node 150 (at a distance of up to 80 km), which would in turn terminate the optical link and generate multiple 10 Gbps links using low cost grey optics that only need to reach a few kilometers. The aggregation node may be one of several different types of electrically powered network devices: a router, a switch, or a muxponder. In contrast, a PON uses optical splitters, which require no electrical power in aggregation node, to send the signal to each child node 170. Given the requirements of operational simplicity, network reliability, and future capacity demand and statistical gain per child node 170, PON architecture is favored, especially coherent PON (CPON) is more attractive because ultra-high data rate per wavelength over a much longer transmission distance with much higher split ratio. Similar to other PON architectures, CPON would comprise of an Optical Line Terminal (OLT) in the hub and Optical Network Units (ONU) at each child node directly, where the CPON ONU would be connected to the different edge devices for different use cases.

With more and more activities being carried out online, ensuring a reliable broadband network connectivity has become critical to operators to provide an uninterrupted access service to consumers (business and residential end users), especially for emerging applications in remote patient monitoring, telerobotic surgery, autonomous cars, home security and other fields. With the optical fiber playing more important role of cable broadband access network and with the transmission rate of fiber channels continuing to improve, especially for coherent PON transport, a significant loss of data service interruptions will occur once there is a single fiber network failure. To meet service level agreement (SLA) and provide the appropriate level of access connection availability, fault management, namely preplanned protection, and dynamic restoration, within access portion of optical fiber network becomes more significant for reliable service delivery and business continuance.

Currently, there are a large number of optical protection and restoration architectures for network survivability implemented in the backbone and metro networks. However, present cable optical access networks are mostly poorly protected or not protected at all. Unlike the backbone, in the access, the types of signals on an optical carrier have very diverse characteristics, have different values and need to be treated differently in case of failures. With the convergence of multiple services and the increasing capacity of coherent PON transport in access networks, eliminating access network vulnerability is pivotal for operators to ensure a reliable Internet connection to consumers.

SUMMARY OF THE EMBODIMENTS

The motivation for embodiments disclosed herein is to design novel resilient schemes and develop cost-efficient protection technologies in the context of CPON transport as the common platform for universal aggregated services.

In a first aspect, a redundancy link includes a first optical splitter and a second optical splitter. The first optical splitter includes (i) a first hub-side port that optically couples to a first optical line terminal, a first hub-side failover-mode port, (iii) a first plurality of node-side splitter-ports each optically coupled to the first hub-side port and the first hub-side failover-mode port, (iii) a first failover-mode port coupled to the first hub-side port. The second optical splitter includes (i) a second hub-side port that optically couples to a second optical line terminal, a second hub-side failover-mode port optically coupled to the first failover-mode port, (iii) a second plurality of node-side splitter-ports each optically coupled to the second hub-side port and the second hub-side failover-mode port, (iii) a second failover-mode port coupled to the second hub-side port.

In a second aspect, a redundancy link includes a first fiber-optic component and a second fiber-optic component. The first fiber-optic component includes (i) a first hub-side port that optically couples to a first optical line terminal, (ii) a first hub-side failover-mode port, (iii) a first node-side failover-mode port optically coupled to each of the first hub-side port and the first hub-side failover-mode port; and (iv) a first node-side port optically coupled to each of the first hub-side port and the first hub-side failover-mode port. The second fiber-optic component includes (i) a second hub-side port that optically couples to a second optical line terminal, (ii) a second hub-side failover-mode port optically coupled to the first node-side failover-mode port, (iii) a second node-side failover-mode port optically coupled to the first hub-side failover-mode port, the second hub-side port, and the second hub-side failover-mode port, and (iv) a second node-side port optically coupled to each of the second hub-side port and second hub-side failover-mode port.

In a third aspect, an optical network includes a hub-side optical splitter. The hub-side optical splitter includes a hub-side splitter-port A01 that optically couples to a first optical line terminal, a hub-side splitter-port A02 that optically couples to a second optical line terminal, a node-side splitter-port A03 optically coupled to each of the splitter-ports A01 and A02, and a node-side splitter-port A04 optically coupled to each of the splitter-ports A01 and A02.

In a fourth aspect, network resiliency architecture includes a first optical splitter, a second optical splitter, and an optical switch. The first optical splitter including a hub-side splitter-port A01 that optically couples to a first optical line terminal, a node-side splitter-port A02 optically coupled to hub-side splitter-port A01; and a node-side splitter-port A03 optically coupled to hub-side splitter-port A01. The second optical splitter including a hub-side splitter-port B01 that optically couples to a second optical line terminal, a node-side splitter-port B02 optically coupled to the hub-side splitter-port B01; and a node-side splitter-port B03 optically coupled to the hub-side splitter-port B01. The optical switch including (a) four inputs port each optically coupled to a respective one of splitter-ports A02, A03, B02, and B03; (b) a first output port that optically couples to a first aggregation node of an optical network; and (c) a second output port that optically couples to a second aggregation node of an optical network.

In a fifth aspect, a network protection method includes determining, with a monitoring node, that optical power of a downlink signal of a first optical link is below a threshold value; and transmitting, with the monitoring node, a network-protection signal to a network protection connected hub of a second optical link. The method also includes transmitting, with a second optical hub and in response to receiving the network-protection signal, a backup downstream signal to a first node of the first optical link; and changing an operating wavelength of the first node from a first wavelength to a second wavelength such that the second hub may communicate with the first node.

DETAILED DESCRIPTION OF THE EMBODIMENTS

1. Protection Designs for Coherent Passive Optical Networks

Figure 1:
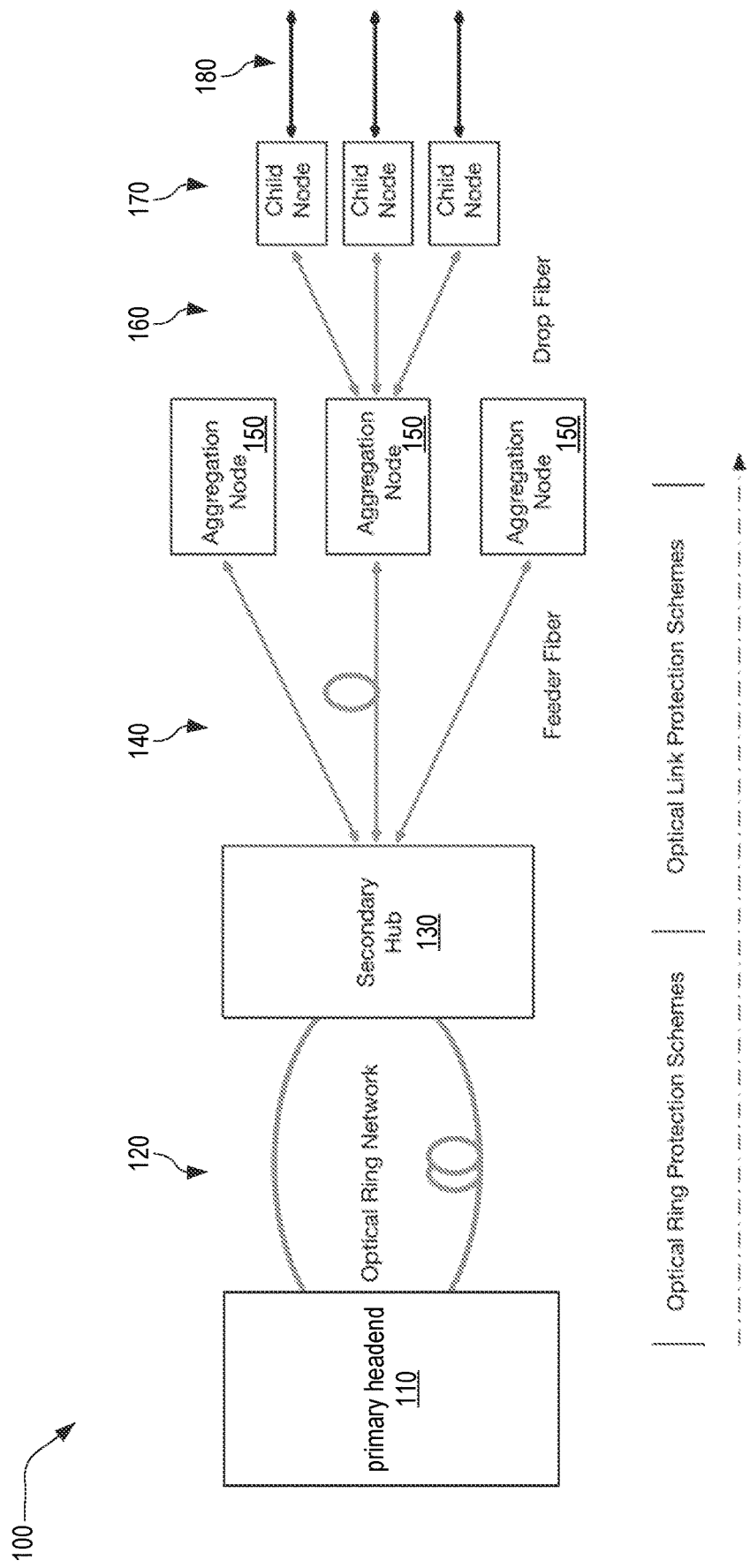
FIG. 1 shows a schematic of distributed access architectures (DAA) designed to deliver high-speed data and video to support a variety of services.
Figure 2:
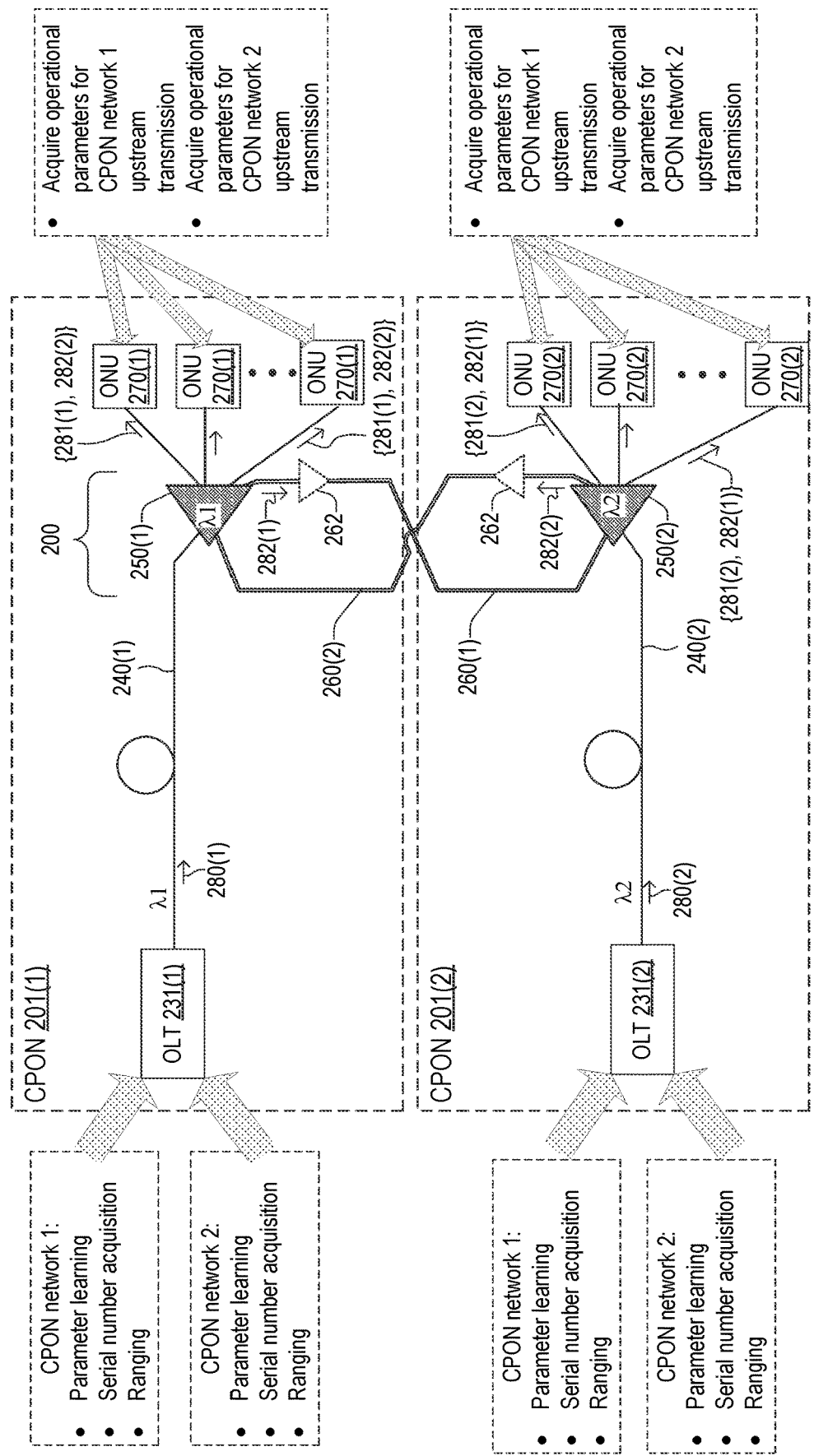
FIGS. 2 and 3 are respective schematics of a first CPON protection design under normal operation and when a fiber link is down, in an embodiment.

FIG. 2 is a schematic of a passive-optical-network (PON) protection design 200, hereinafter protection design 200, coupled between two coherent passive optical networks 201(1) and 201(2). CPON 201(1) includes an optical line terminal (OLT) 231(1), a passive optical splitter 250(1), and an optical fiber link 240(1) coupled therebetween. CPON 201(2) includes an OLT 231(2), a passive optical splitter 250(2), and an optical fiber link 240(2) coupled therebetween. OLTs 231 may be part of a secondary hub, such as secondary hub 130. Herein, an element in the figures denoted by a reference numeral suffixed by a parenthetical numeral is an example of the element indicated by the reference numeral. For example, optical fiber link 240(2) is an example (2) of optical fiber link 240.

While only two OLTs 231(1,2) are shown in FIG. 2, the design principle can be applied to more than two OLTs. Under normal operation, the OLTs 231(1) and 231(2) operate at different wavelengths, i.e., $\lambda_1$ $\lambda_2$ and $\lambda_2$, respectively. These wavelengths are carrier wavelengths. Passive optical splitter 250(k) has a 2×(N+1) configuration where N represents the number of ONUs 270(k) coupled to passive optical splitter 250(k), where k equals either one or two in this example. At least one ONU 270 may be a coherent ONU. Herein, normal CPON fiber links are shown as single lines, whereas protection fiber links are shown as double lines.

Protection design 200 includes passive optical splitters 250(1) and 250(2) and protection fiber-optic links 260(1) and 260(2). Compared with standard optical splitters in a PON network, which usually have a 1×N configuration, the extra input and output ports on the optical splitters allow extra network protection by connecting two adjacent splitter nodes via protection fiber-optic links 260. While FIG. 2 illustrates passive optical splitters 250(1) and 250(2) as being in different optical networks, passive optical splitters 250(1) and 250(2) may be in the same optical network without departing from the scope hereof.

A length of optical fiber link 240 may be between one kilometer and three hundred kilometers long. Optical fiber link 240 is an example of optical fiber link 140. A length of protection fiber-optic link 260 may be between fifty meters and five kilometers.

Passive optical splitter 250 may be part of, or function as, an aggregation node of CPON 201. It is also noted that the extra output can be one of regular outputs to one of the ONUs. Under normal operation, a downstream signal 280(1) from OLT 231(1) at wavelength $\lambda_1$ is sent to ONUs 270(1), whose local oscillators are tuned to $\lambda_1$ to receive the downstream signal, and also transmit an upstream signal at $\lambda_1$ to OLT 231(1). Similarly, a downstream signal 280(2) from OLT 231(2) at wavelength $\lambda_2$ is received by ONUs 270(2) with local oscillators tuned to $\lambda_2$. ONUs 270(2) transmit upstream signals at $\lambda_2$ to OLT 231(2).

Passive optical splitter 250(1) splits signal 280(1) to yield (a) signals 281(1), which propagate to ONUs 270(1), and (b) a downstream redundancy signal 282(1), which propagates to ONUs 270(2) via protection fiber-optic link 260(1) and passive optical splitter 250(2). Under normal operation, ONUs 270(2) will not detect downstream redundancy signal 282(1), which has wavelength $\lambda_1$, because ONUs 270(2) are tuned to wavelength $\lambda_2$.

Similarly, passive optical splitter 250(2) splits signal 280(2) to yield (a) signals 281(2), which propagate to ONUs 270(2), and (b) a downstream redundancy signal 282(2), which propagates to ONUs 270(1) via protection fiber-optic link 260(2) and passive optical splitter 250(1). Under normal operation, ONUs 270(1) will not detect downstream redundancy signal 282(2), which has wavelength $\lambda_2$ because ONUs 270(1) are tuned to wavelength $\lambda_1$.

A splitting ratio of passive optical splitter 250 may be in the range from 95:5 to 50:50. While passive optical splitter 250 is illustrated as a single component, any passive optical splitter 250 disclosed herein may include two or more cascaded optical splitters.

In embodiments, three phases including parameter learning, serial number acquisition, and ranging in the activation process are implemented in the initial learning parameter phase for both CPONs 201(1) and 201(2). Each OLT 231(1) may store information of both its normal link ONUs 270(1) and its protection link ONUs 270(2) with the wavelength as the identifier. Similarly, each OLT 231(2) may store information of both its normal link ONUs 270(2) and its protection link ONUs 270(1) with the wavelength as the identifier. Furthermore, all the ONUs in this protection domain (ONUs 270) may acquire the operational parameters that are needed in the upstream transmission in this phase as well. An example of the initial activation process is included in FIG. 2. This activation process and information stored in ONUs 270 and OLT 231, as described in this paragraph, is applicable to embodiments of subsequent protection designs, network architectures, and resiliency architectures disclosed herein.

Figure 3:
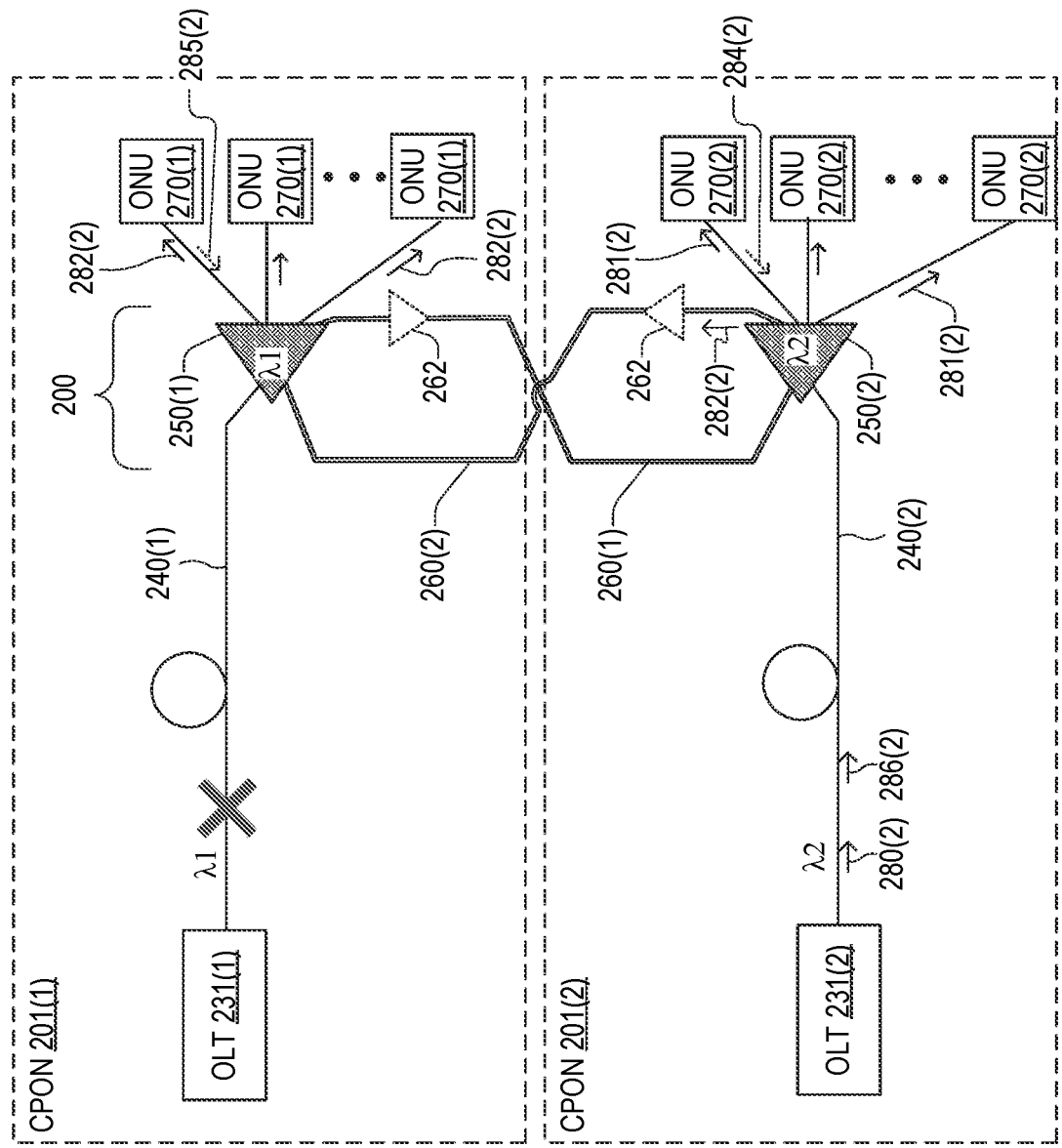

Each OLT 231 may include a coherent transceiver, and each ONU 270 may include a coherent transceiver. The advantage of a coherent transceiver is that the respective operating wavelengths of both its transmitter and local oscillator are adjustable. This enables ONUs 270(m) of CPON 201(m) to receive signals from the OLT 231(n) of the CPON 201(n) when either an OLT 231(m) or an optical fiber link 240(m) malfunctions, where either m=1 and n=2, or m=2 and n=1. FIG. 3 illustrates an example where m=1 and n=2.

In FIG. 3, optical fiber link 240(1) is down, OLT 231(2) transmits a backup downstream signal 286(2), and the upstream transmission wavelengths of ONUs 270(1) are subsequently changed accordingly. When optical fiber link 240(1) is down, signal 280(1) (at wavelength $\lambda_1$) is no longer available, and CPON 201(1) is operating at wavelength $\lambda_2$. In response to ONUs 270(1) detecting that signal 280(1) is not present or attenuated to a predetermined value, each ONU 270(1), previously operating at wavelength 11, switches its operating wavelength to wavelength $\lambda_2$, for both transmitters and local oscillators. OLT 231(2), which is running at wavelength $\lambda_2$, will now provide downstream signals and receive upstream signals from all the ONUs.

In embodiments, when OLT 231(1) or fiber link 240(1) malfunctions, one or more ONUs 270(1) or 280(2) initiate the above-described protection scheme by transmitting a network-protection signal to OLT 231(2). When either OLT 231(1) or fiber link 240(1) malfunctions, the optical power of downstream redundancy signal 282(1) decreases. By sending signal 281(1) to ONUs 270(1), network protection design 200 enables ONUs 270(1) to monitor the status of CPON 201(1). Similarly, by sending signal 282(1) to ONUs 270(2), network protection design 200 enables ONUs 270(2) to monitor the status of CPON 201(1).

In embodiments, an ONU 270(2) monitors the optical power of downstream redundancy signal 282(1). When this optical power decreases below a predetermined threshold, this ONU 270(2) transmits network-protection signal 284(2) to OLT 231(2), which causes OLT 231(2) to send backup downstream signal 286(2) to ONUs 270(1). The wavelength of network-protection signal 284 (2) equals wavelength $\lambda_2$.

In embodiments, one or more ONUs 270(1) initiate the above-described protection scheme by transmitting a network-protection signal 285(2) to OLT 231(2). The wavelength of network-protection signal 285 (2) equals wavelength $\lambda_1$. ONU 270(1) monitors the optical power of downstream redundancy signal 282(1). When the optical power of signal 282(1) decreases below a predetermined threshold, this ONU 270(1) transmits, via protection fiber-optic link 260(2), network-protection signal 285(2) to OLT 231(2), which causes OLT 231(2) to send backup downstream signal 286(2) to ONUs 270(1).

The number of ONUs 270 that can be protected is dependent on the optical power budget for each OLT 231. Passive optical splitter 250 may provide different splitting power level for at least one of its protection ports, to which a protection fiber-optic link 260 is coupled. Protection design 200 may include optical amplifiers 262 for increasing the power level of the redundancy signal, and hence enhance the power budget of protection design 200.

While protection design 200 offers network redundancy and service backup when either the OLT 231 or optical fiber link 240 is down, it requires fiber connection between two adjacent splitter nodes. Depending on the distance between the splitter nodes, this design may introduce extra fiber deployment cost.

Figure 4:
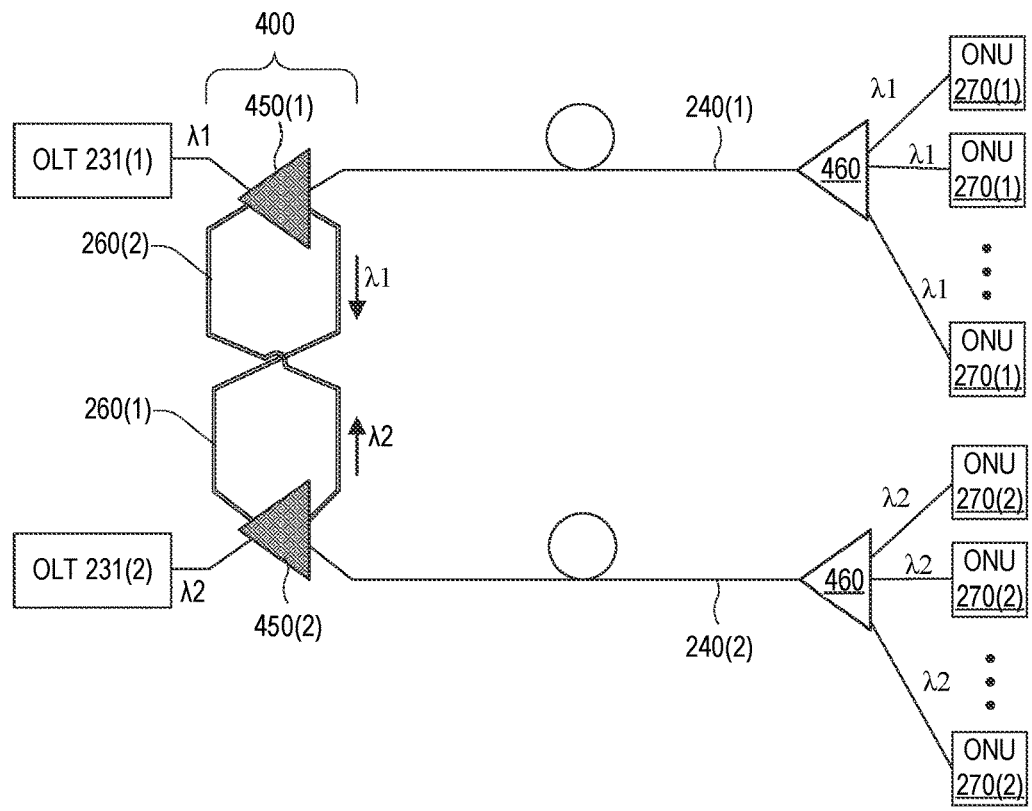
FIGS. 4 and 5 are respective schematics of a second CPON protection design under normal operation and when an optical line terminal is down, in an embodiment.
Figure 5:
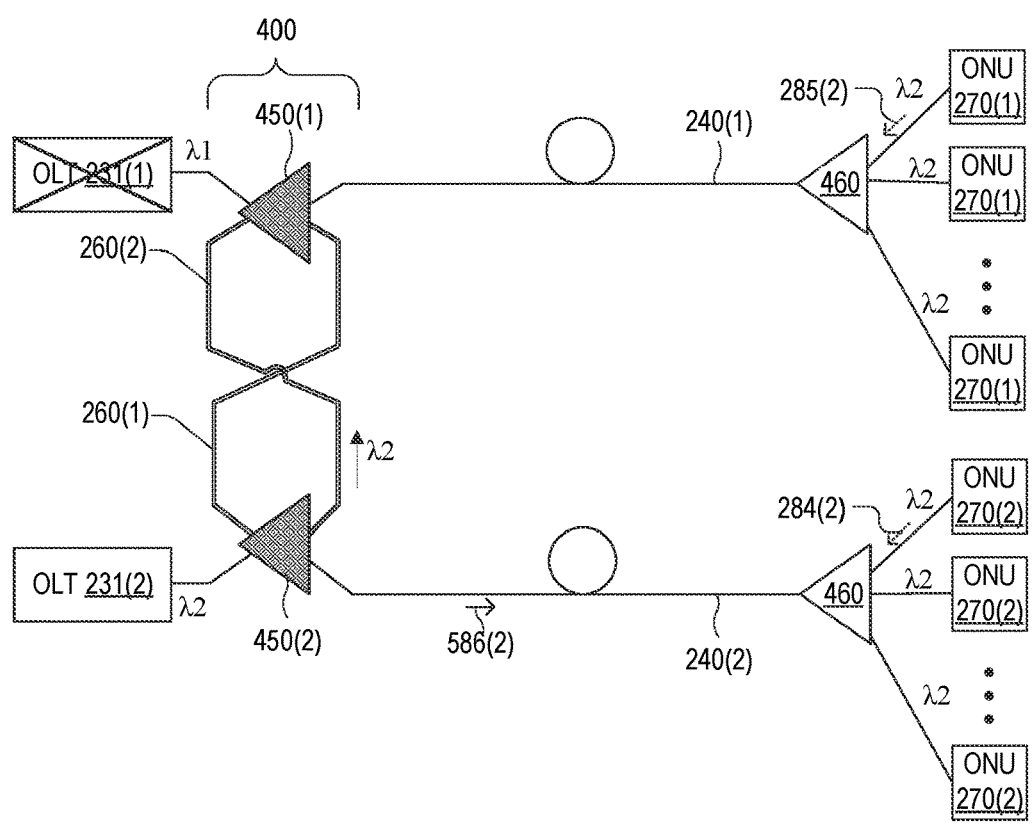

An alternative CPON protection design is shown in FIGS. 4 and 5, where a PON protection design 400 does not require fiber connection between splitter nodes. In protection design 400, two OLTs 231 located in the same central office are connected by a pair of passive optical splitters 450. Optical splitter 450 may be a $M_1 \times M_2$ optical splitter, where each of $M_1$ and $M_2$ is at least two. As in protection design 200, OLT 231(1) operates at wavelength $\lambda_1$ and supports, via optical splitters 460, multiple ONUs 270(1) running the same wavelength. Similarly, OLT 231(2) and corresponding ONUs 270(2) operate at wavelength $\lambda_2$. When OLTs 231 and ONUs 450 include coherent transceivers, both OLTs 231 and all ONUs 270 receive the two wavelengths simultaneously, but detect only the wavelength that their respective local oscillators are tuned to. Protection design 400 offers redundancy and protection to ONUs 270. Optical splitter 460 may be part of, or function as, an aggregation node of an optical network that includes one OLTs 231.

When an OLT malfunction occurs, e.g., as shown in FIG. 5 where OLT 231(1) is down, OLT 231(2) (running at wavelength $\lambda_2$) sends a backup downstream signal 586(2) to ONUs 270(1). ONU 270(1) sends a In response to receiving signal 586(2), each ONU 270(1) changes its upstream transmission wavelength to wavelength $\lambda_2$. As wavelength $\lambda_1$ is no longer available, now ONUs 270(1) that were previously operating at wavelength $\lambda_1$ is now switched to wavelength $\lambda_2$, for both transmitters and local oscillators. In this scenario, OLT 231(2) provides downstream signals and receive upstream signals from all ONUs 270. As in protection scheme 200, an ONU 270(1) or an ONU 270(2) may initiate the above-described protection scheme by transmitting a network-protection signal 285(2) or 284(2), respectively, to OLT 231(2).

Protection designs 200 and 400 use passive optical splitters 450 as the key components to provide network redundancy. Although passive optical splitters are typically lower in cost compared to analogous active components, and do not require active power sources, which make them suitable devices for optical distribution networks (ODNs) in PON, they usually introduce excess optical insertion loss. The insertion loss associated with the passive splitters reduces link power budget is undesirable under certain scenarios where link budget is already tight.

Figure 6:
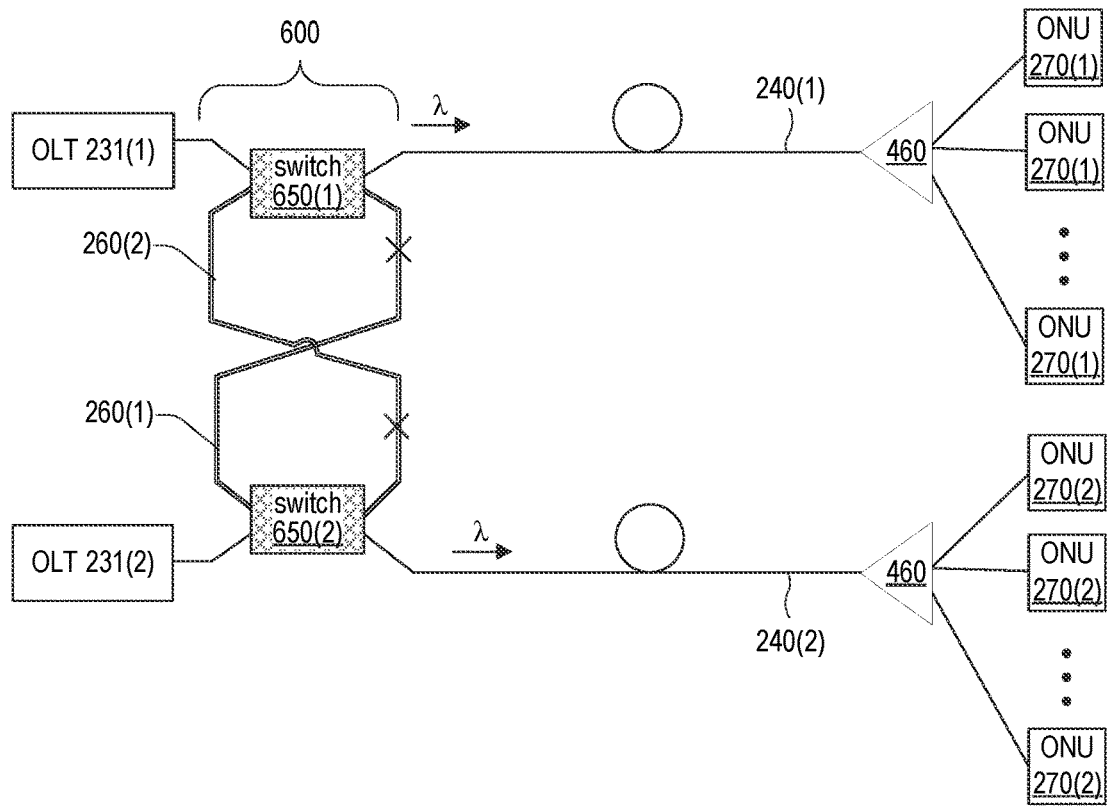
FIGS. 6 and 7 are respective schematics of a third CPON protection design under normal operation and when an optical line terminal is down, in an embodiment.
Figure 7:
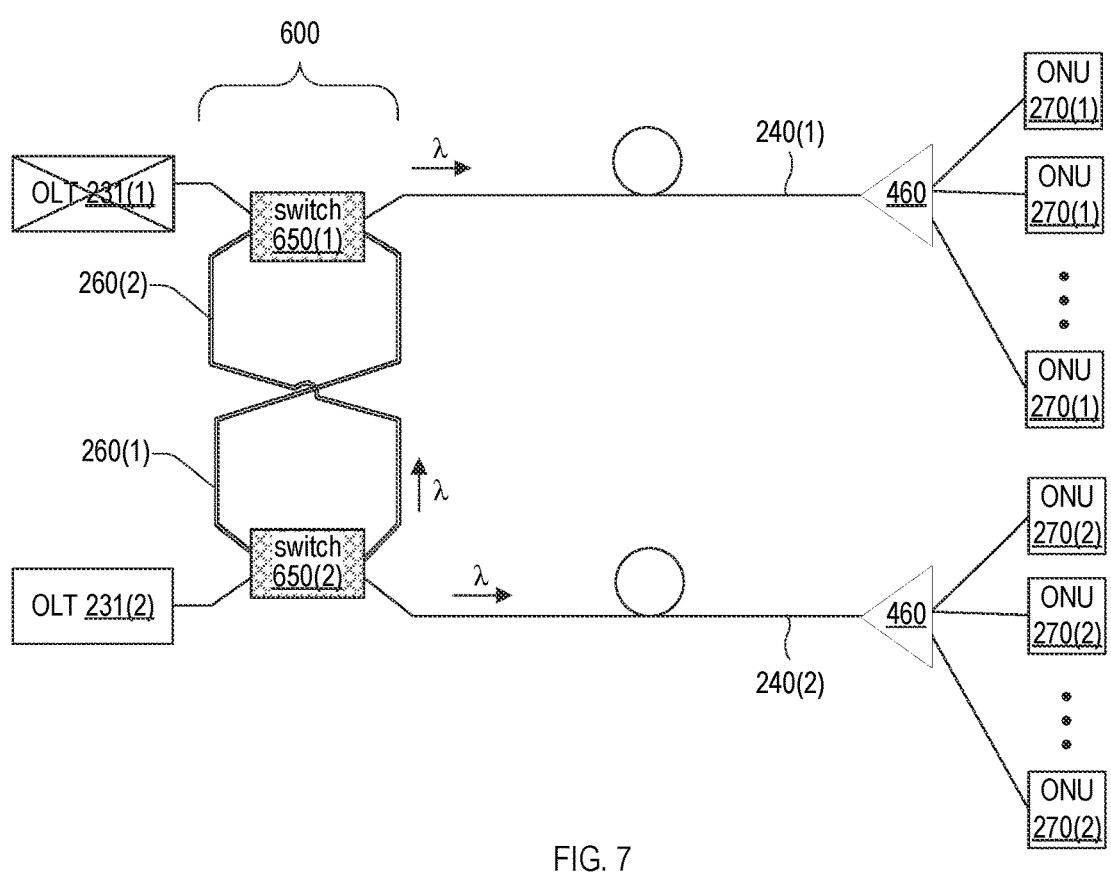

FIGS. 6 and 7 are schematics of a CPON protection design 600. The configuration and working principle are similar to protection design 400, the major difference being that each passive splitters 450(1, 2) are replaced by a respective optical switches 650(1, 2). Switch 650 is an $N_1 \times N_2$ switch, where each of $N_1$ and $N_1$ is greater or equal to two. Under normal operation, the backup ports (each labeled by a cross) are closed, and OLTs 231(1) and 231(2) connected to the ONU 270(1) and 270(2), respectively. Note that since the backup ports are closed during normal operation, both OLTs 231 and corresponding ONUs 270(1, 2) may operate at the same wavelength $\lambda$, e.g., when both OLTs 231 are located in the same central office. OLTs 231 and ONUs 270(1, 2) may operate at different wavelengths without departing from the scope hereof.

Compared with protection designs 200 and 400 that feature passive optical splitters, CPON protection design 600 offers lower insertion loss and thus higher link budget by using optical switches 650, and also allows the network running at the same wavelength which can potentially simplify hardware in the optical transceivers. Although optical switches are more expensive than passive splitters, switches 650 may be located in the central office such that their cost can be shared among multiple ONUs 270.

When an OLT malfunction occurs, for example, as shown in FIG. 7 where OLT 231(1) is down, the two backup ports on the optical switches 650 are turned on. In this scenario, OLT 231(2) provides a downstream signal to each ONU 270(1), which had been supported by OLT 231(1), and also receive upstream signal from ONUs 270(1). OLT 231(2) and all ONUs 270 remain operating at wavelength $\lambda$ in this scenario.

2. Point-to-Multipoint Coherent Technology

The ever-increasing demand for bandwidth has been driven by continuing growth of data intensive applications such as 5G Xhaul, HD-video stream, cloud services, and internet of things (IoTs) over the past decade. As a cost-effective solution, passive optical network (PON) based on power splitting has been extensively studied and widely adopted in today's optical access networks. Among various access technologies, point-to-multipoint (P2MP) coherent technology is considered as a future-proof solution for next-generation 100G-class PON, thanks to its high sensitivity and powerful digital equalization of fiber transmission impairments.

As PON data rate evolving towards 100 Gb/s/$\lambda$, more traffic and bandwidth will be carried by the network, protection of key components becomes unprecedently important. Emerging applications in the field of remote health monitoring, telerobotic surgery, autonomous cars, home security and other fields require uninterrupted access service to the end user. Today, existing PON protection schemes usually require complex optical switches and control units, or redundant devices such as optical line terminals (OLTs) and backup fiber links, which can increase the deployment cost significantly. As a result, although there are many optical protection and restoration architectures implemented in the backbone and metro networks, the present optical access networks are mostly poorly protected or not protected at all. Developing a cost-effective protection scheme is critical to the success of future P2MP coherent network for supporting various traffic needs.

Another major hurdle for large-scale adoption of P2MP coherent network in the access networks is the prohibitively high cost associated with the existing long-haul coherent optics. High quality light sources such as external cavity lasers (ECLs) dedicated for coherent transmitters and local oscillators contribute a large portion of the overall cost. For short-haul applications, these expensive devices can be replaced by alternative solutions based on optical frequency comb and optical injection locking (OIL) of low-cost Fabry-Perot laser diodes (FP-LDs).

We disclose herein a mutually protected P2MP coherent network architecture employing optical frequency comb, OIL, and remote optical carrier delivery. The mutual protection of critical parts such as OLT and feeder fibers in two adjacent P2MP coherent networks can be realized by connecting the passive nodes without requiring complex switching devices or redundant OLTs. The combined use of optical frequency comb and OIL greatly reduces the number of high-cost lasers in a P2MP coherent network system, the mechanism of remote optical carrier delivery also ensures fast service restoration without requiring wavelength switching for all optical network units (ONUs). System performance and functionality of the protection mechanism have been verified through downstream and upstream transmission of 100 Gb/s data rate coherent signals (from both discrete components and commercial coherent optics) through 50 km single mode fiber (SMF) link and cascaded splitters (2×2+1×32) in both normal operation and protection mode.

2.1 Example P2MP Protection Designs

Figure 8:
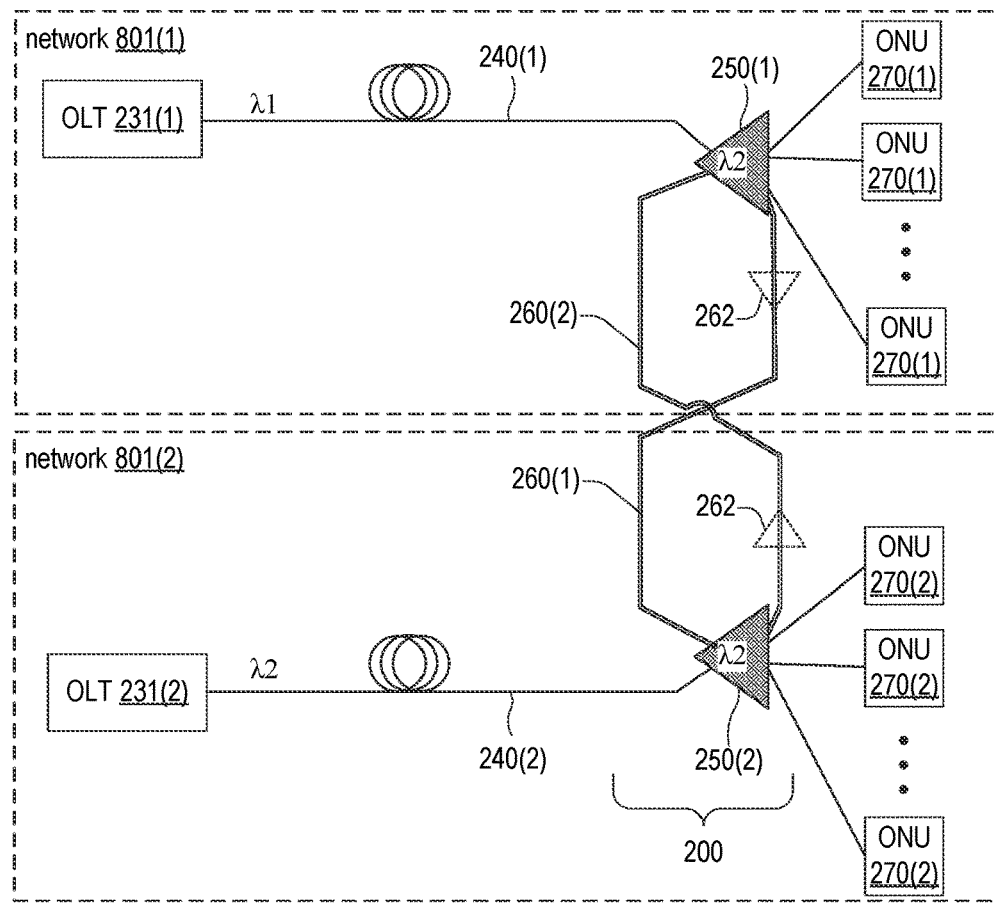
FIG. 8 is a schematic of the protection design of FIG. 2 operating to protect OLT and feeder fibers in P2MP coherent access networks, in an embodiment.

FIG. 8 shows the high-level schematic of protection design 200 operating to protect OLT and feeder fibers in P2MP coherent access networks 801(1) and 801(2). Leveraging the high power budget and the wavelength tunability of coherent optics, two adjacent P2MP coherent networks can provide protection to each other by connecting the passive nodes. Under normal operation, P2MP coherent networks work at different wavelengths, i.e., $\lambda_1/\lambda_2$ (downstream/upstream) for the upper P2MP coherent network, and $\lambda_3/\lambda_4$ for the lower P2MP coherent network.

Although P2MP coherent networks 801(1) and 801(2) are interconnected, by running at different wavelengths the two networks will not interfere with each other. When a feeder fiber or an OLT breakage occurs, i.e., if OLT 231(1) or optical fiber link 240(1) is down, protection activation signals are sent to all ONUs 270(1). In such a scenario, all ONUs 270(1) that were previously operating at $\lambda_1/\lambda_2$ are switched to $\lambda_3/\lambda_4$, for both transmitters and local oscillators. OLT 231(2), which is running at $\lambda_3/\lambda_4$, provides downstream signals and receive upstream signals from all the ONU 270.

As in the implementation of protection design 200 in FIG. 2, protection design 200 in FIG. 8 may be extended to protect respective optical links of more than two networks. The protection port and the regular splitting port can be designed in a flexible way with asymmetric splitting ratios to accommodate different network configurations and application scenarios. Also, as in FIG. 2, prior to operation, both OLTs 231 and all ONUs 270 may acquire operational parameters for both coherent networks during ranging process.

Protection of a PON is quantitatively evaluated by its availability, the fraction of time the system or service behaves as intended. For a given system, its availability $A=1-\Sigma_i^N MTTR_i/(MTBF_i+MTTR_i)$, where MTBR defines mean time between failures, and MTTR is the mean time to restore or repair. A goal of the industry is to achieve 99.999% availability, which equivalent to a system being unavailable less than 5.25 minutes in a year. Table 1 shows statistical failure in time (failure frequency in $10^9$ hours: FIT=$10^9$/MTBF) and MTTR for PON components, as documented in ITU-T Rec. G.Sup51 and J. Chen, et al., in IEEE Commun. Mag, 48(2), 56-65, 2010. Based on the parameters in Table 1, an unprotected PON can only have an availability of 99.973%, far from the industrial goal of 99.999%. With protection scheme 2000 as implemented proposed in FIG. 8, the MTTR of the feeder fiber and OLT can be significantly reduced, from several hours down to minutes.

TABLE 1

Failure Rates and repair time for PON Components

|  | FIT | MTTR |
| --- | --- | --- |
| OLT | 2500 | 8 hrs. |
| ONU | 256 | 8 hrs. |
| Feeder Fiber | 50 km × 200/km | 24 hrs. |
| Drop Fiber | 2 km × 200/km | 24 hrs. |
| Splitter | 100 | 8 hrs. |

Figure 9:
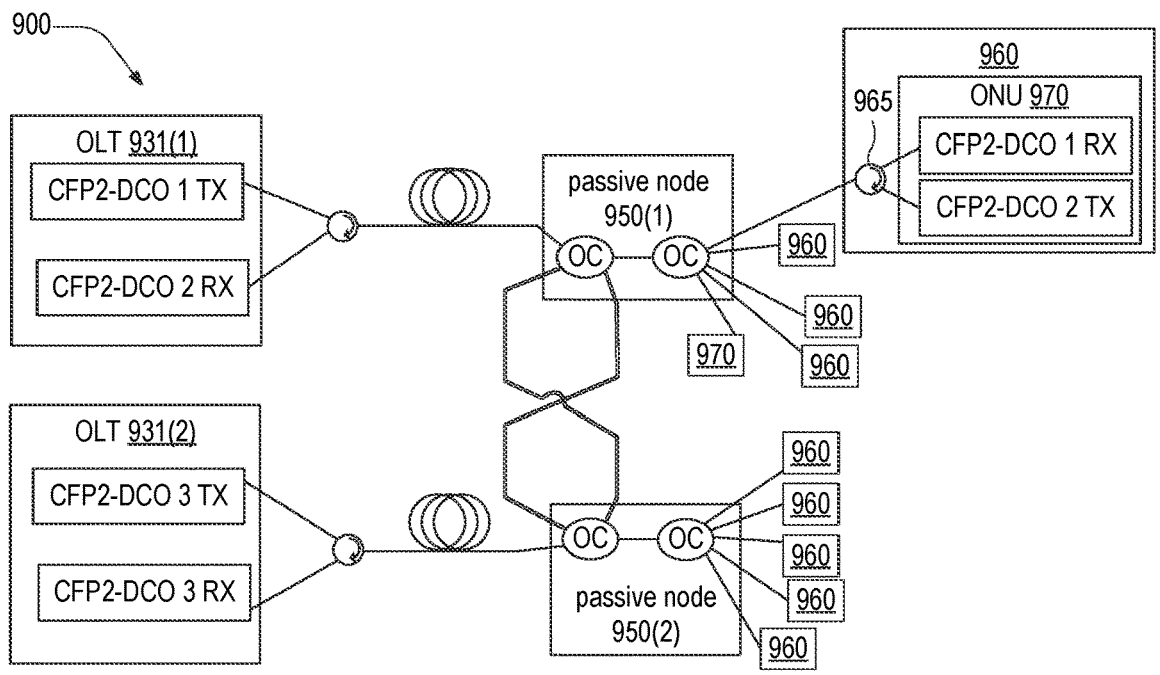
FIG. 9 is a schematic of an experimental demonstration of the protection design of FIG. 2 operating in FIG. 8, in an embodiment.

As a proof of the concept, we start with testing the mutual protection scheme using commercially available products. FIG. 9 shows an experimental setup 900 that includes OLTs 931(1) and 931(2), passive nodes 950(1) and 950(2), optical circulators 965, and a plurality of ONUs 970. Each OLT 931, passive node 950, and ONU 970 is a respective example of OLT 231, passive optical splitter 250, and ONU 270. Passive node 950 includes a pair of cascaded optical couplers/splitters. For clarity of illustration, FIG. 9 denotes an element-pair 960 that includes one circulator 965 and one ONU 970.

Figure 10:
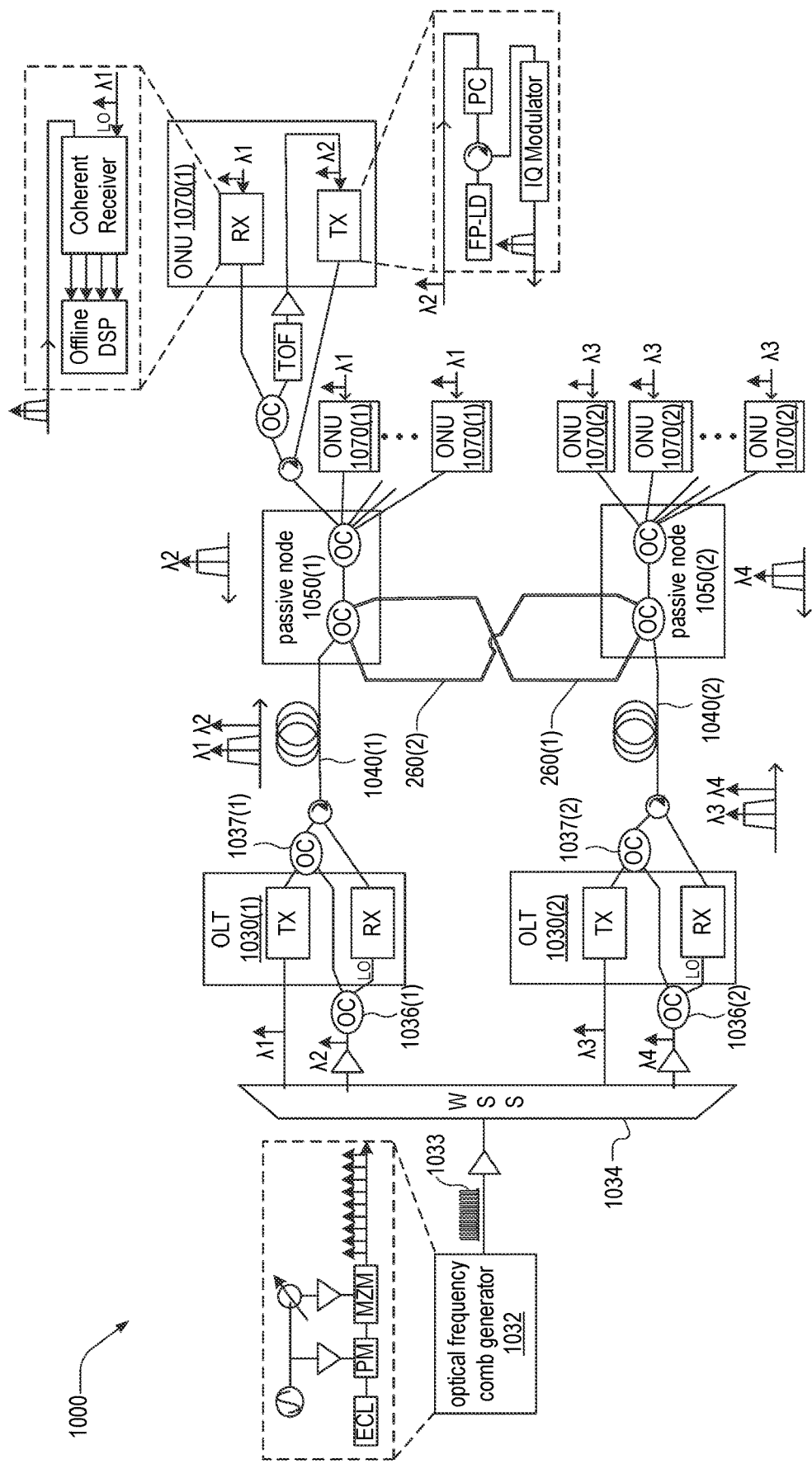
FIGS. 10 and 11 are schematics of a P2MP coherent network architecture during normal operation and protection operation respectively, in an embodiment.

Each OLT 931 and ONU 970 includes two commercial C-form-factor pluggable-digital coherent optics (CFP2-DCO) modules (operating the mode of 100 Gb/s date rate). Each CFP2-DCO module is one of CFP2-DCO 1, CFP2-DCO 2, and CFP2-DCO 3, as shown in FIG. 10. CFP2-DCO 1 is tuned to wavelength $\lambda_1$ (1548.12 nm) and CFP2-DCO 2 is tuned to wavelength $\lambda_2$ (1548.52 nm) for downstream and upstream transmission under normal operation, where CFP2-DCO 3 is used at protection device and tuned to $\lambda_1/\lambda_2$ for downstream and upstream protection operation. Initial test using commercial devices verified the functionality of the mutual protection scheme.

However, changing upstream and downstream operating wavelengths of all ONUs is still challenging and time consuming, as most of today's commercially available coherent optics are not optimized for fast wavelength switching. Faster service restoration may be provided by a P2MP coherent network protection scheme based on optical frequency comb and remote delivery of optical carriers via an OIL process. Without requiring ONU-wavelength switching, the mutual protection between two P2MP coherent networks can be achieved by tuning an optical filter or wavelength selective switch (WSS). The proposed protection scheme can reach 99.999% availability, with i.e., 50-ms MTTR for OLT and feeder fiber. With this design, one can exceed the 99.999% goal by adding ONU/drop fiber redundancy. Herein, we focus on the OLT and feeder fiber protection. The proposed design can also be applied in the hub/central office (CO) for OLT protection only, depends on requirements for different application scenarios.

2.2 Experimental Setup and Results

Figure 11:
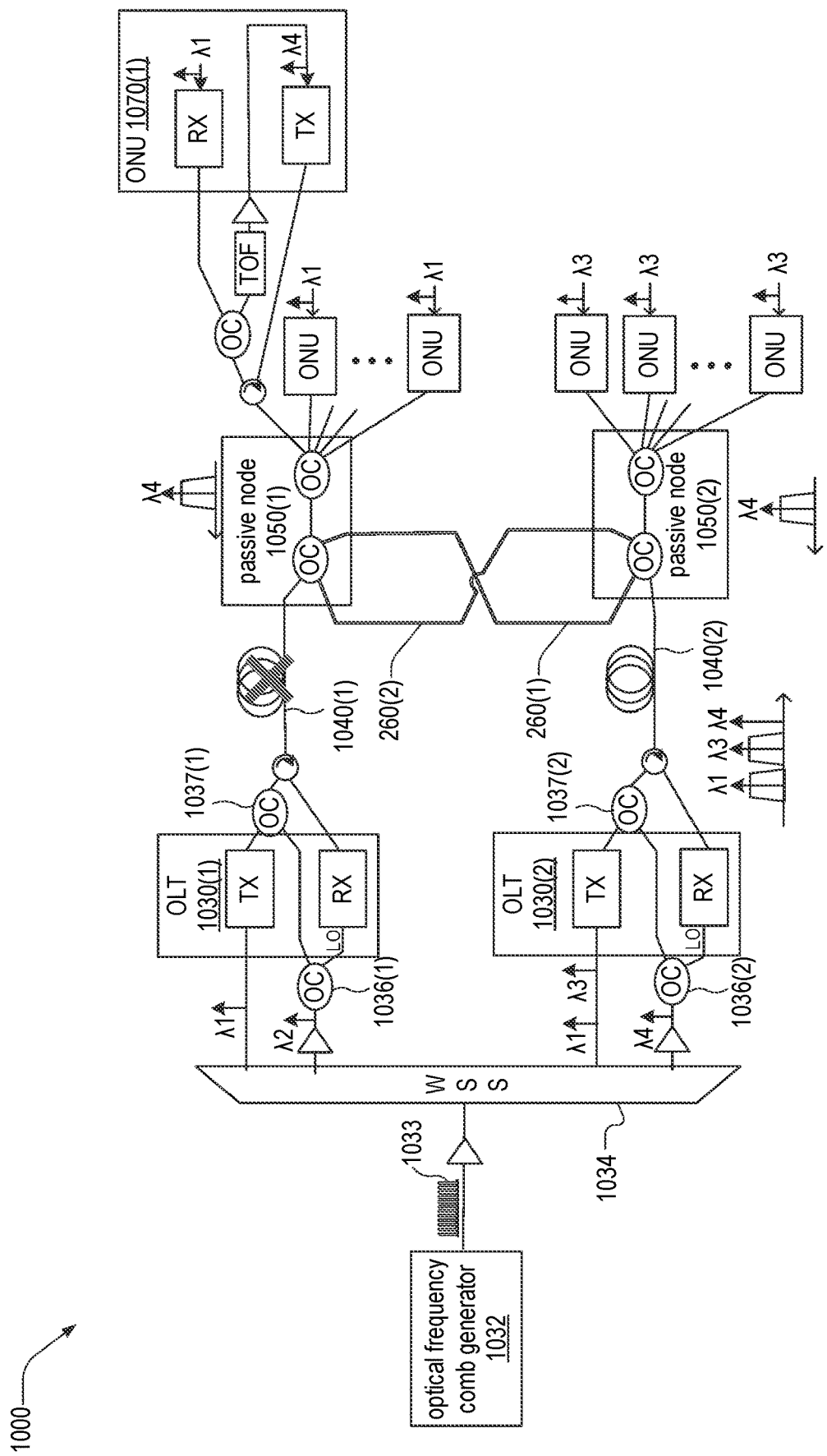

FIGS. 10 and 11 are schematics of a P2MP coherent network architecture 1000 during normal operation and protection operation, respectively. Network architecture 1000 includes an optical frequency comb generator 1032, a wavelength-selective switch (WSS) 1034, OLTs 1030(1, 2), single-mode fibers 1040(1, 2) passive nodes 1050(1, 2), protection fiber-optic links 260(1) and 260(2), ONUs 1070(1), and ONUs 1070(2). Each OLT 1030, passive node 1050, and ONU 1070 is a respective example of OLT 231, passive optical splitter 250, and ONU 270. Protection fiber-optic links 260 connect passive nodes 1050 is in protection design 200.

On the OLT side, comb generator 1032 includes an ECL, a phase modulator, and a Mach-Zehnder modulator. Comb generator 1032 generates an optical frequency comb 1033 by modulating the output of the ECL with the phase modulator followed by the Mach-Zehnder modulator. In this example, both modulators are driven by a 25-GHz RF signal. Four of the comb tones ($\lambda_1$: 1563.46 nm, $\lambda_2$: 1563.86 nm, $\lambda_3$: 1564.26 nm, $\lambda_4$: 1564.66 nm), after amplification, are filtered out by WSS 1034 with 50-GHz channel spacing to match ITU-T 50-GHz frequency grid. In OLT 1030(1) of the upper P2MP coherent network, $\lambda_1$ is fed into a coherent driver modulator (CDM) (3-dB bandwidth of 40 GHz) to generate downstream signals. We use 30-GBd DP-QPSK signal targeting 100 Gb/s data rate. An optical coupler 1036(1) splits the $\lambda_2$-signal in two: one is utilized as the local oscillator (LO) to detect upstream signals; the other is combined with downstream signals via an optical coupler 1037(1) and sent downlink through single-mode fiber 1040(1) as an optical carrier for upstream signal generation. In this example, single-mode fibers 1040 are 50-km long. Each passive node 1050 includes a 2×2 passive splitter cascaded with a 1×32 passive splitter, where the 2×2 splitter provides interconnection between the two P2MP coherent networks.

On the ONU side of the link, the remote delivered optical tone (22) is filtered out by a tunable optical filter (TOF) and used as the seed light to generate upstream optical carrier via OIL. The OIL slave laser is a FP-LD, with seed light injected into its cavity via an optical circulator. The generated optical carrier at $\lambda_2$ is then sent to a CDM for upstream signal transmission. The downstream signals are mixed with a local oscillator at $\lambda_1$ and detected by an integrated coherent receiver (ICR). The obtained radio frequency (RF) signals for the I/Q components are sent into an optical modulation analyzer acquired at 80GS/s and processed offline with a MATLAB program. Downstream and upstream signals at the OLT and the ONU side are routed by corresponding optical circulators.

The lower P2MP coherent network operates in the same way as the upper P2MP network, with $\lambda_3$ for downstream and $\lambda_4$ for upstream transmission, and includes optical couplers 1036(2) and 1037(2). When network failure occurs, i.e., when OLT 1030(1)/single-mode fiber 1040(1) is down as shown in FIG. 11, downstream signal at $\lambda_1$ will be provided by OLT 1030(2), and upstream carrier frequency will be changed to $\lambda_4$. In this scheme, wavelength adjustment of all ONUs 1070 is not required, and network protection can be achieved via fast switching of WSS 1034.

Figure 12:
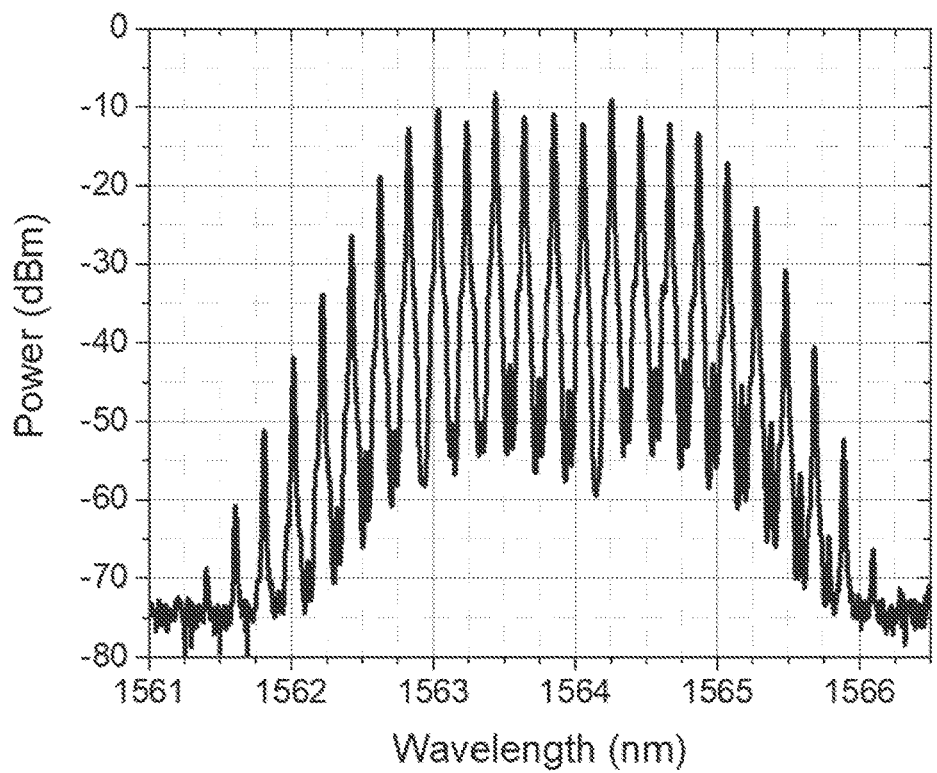
FIGS. 12-15 are plots of measured optical spectra and bit-error rates of an embodiment of P2MP coherent network architecture of FIG. 10.
Figure 13:
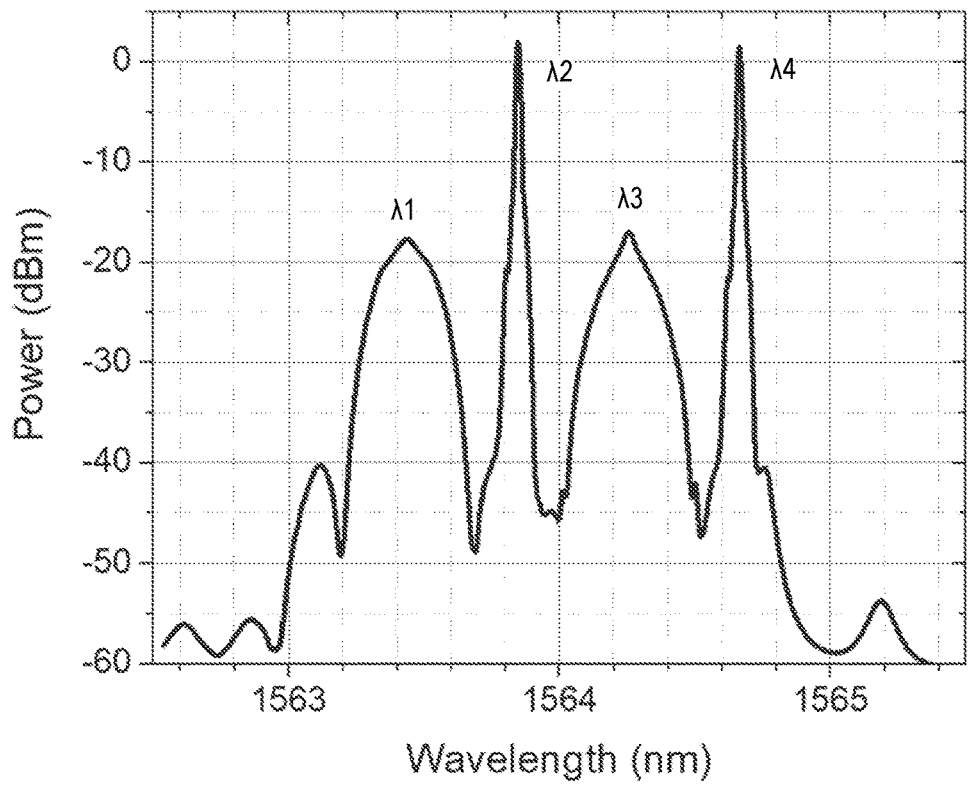
Figure 14:
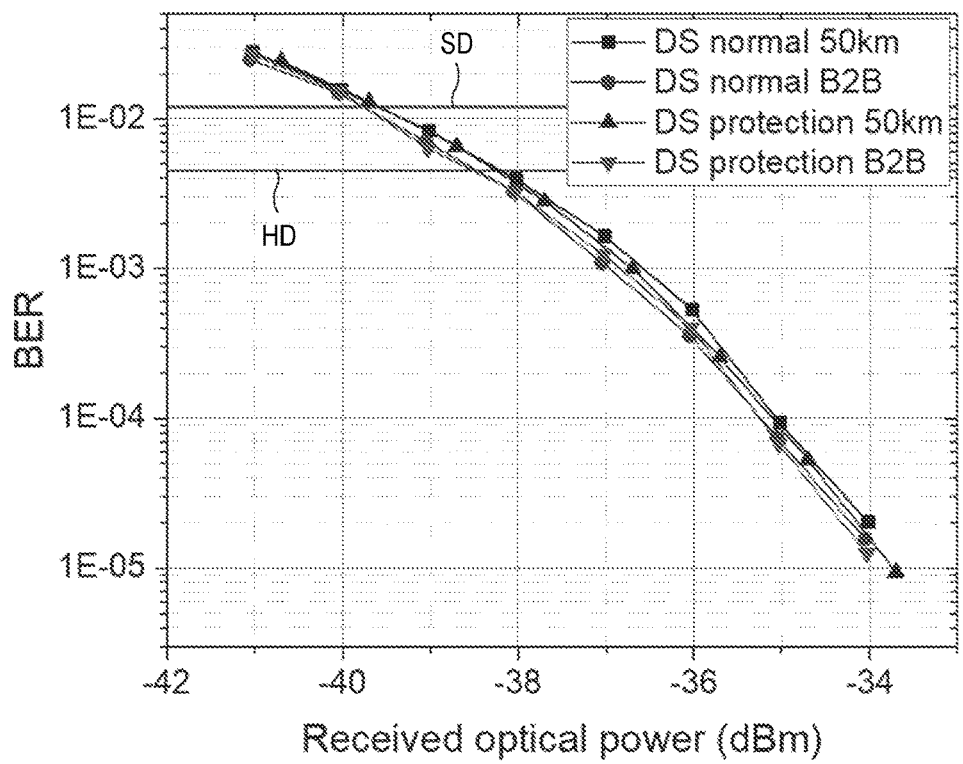
Figure 15:
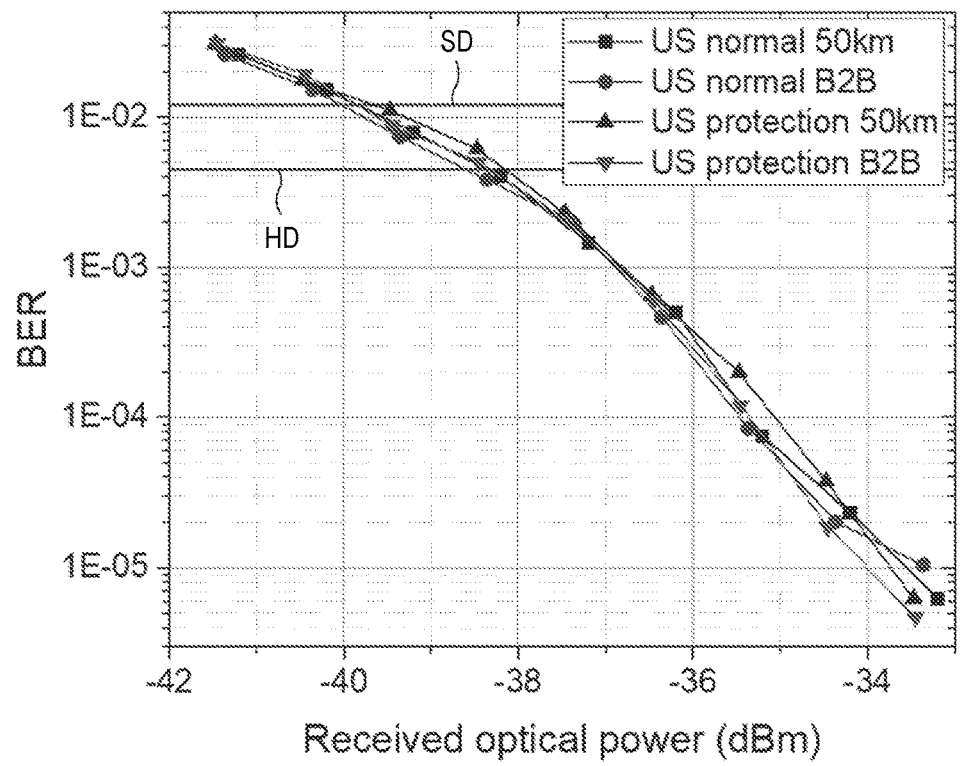

FIGS. 12-15 are plots of measured optical spectra and bit-error rates of an embodiment of P2MP coherent network architecture 1000. FIG. 12 shows an optical spectrum of a generated optical frequency comb centered at 1563.86 nm with 25-GHz spacing between adjacent tones. The optical frequency comb is an example of optical frequency comb 1033. FIG. 13 shows the spectrum of our downstream signals ($\lambda_1$ and $\lambda_3$) coupled with the two remote-delivered optical carriers after OIL ($\lambda_2$ and $\lambda_4$). FIGS. 14 and 15 show bit-error-rate (BER) performance versus received optical power (ROP) for the 30-GBd DP-QPSK coherent signal with constellation diagrams, for downstream and upstream transmission, respectively. The test was performed using a variable optical attenuator (VOA) to adjust the received optical power at the coherent receiver. For reference, staircase hard-decision (HD) forward error correction (FEC) threshold (BER=$4.5 \times 10^{-3}$) and concatenated soft-decision (SD) FEC threshold (BER=$1.2 \times 10^{-2}$) are plotted as horizontal lines labeled HD and SD, respectively. Results for system under normal operation and protection mode, for both back-to-back (B2B) and 50 km fiber link are included. From the results, system performances under normal operation and protection mode are very similar, no significant penalty has been observed.

2.3. P2MP Conclusion

FIGS. 8-15 and the associated description demonstrate embodiments of a mutually protected P2MP coherent network architecture without requiring complex switching components, or redundant fiber and OLTs. With this scheme, system complexity and response time for network protection are greatly reduced. The combination of optical frequency comb and OIL also significantly reduces the number of high-cost ECLs in the P2MP system. Remote optical carrier delivery ensures fast service restoration without requiring wavelength switching for all ONUs. System performance and functionality of the protection mechanism have been verified through downstream and upstream transmission of 100 Gb/s date rate coherent signals through a 50-km SMF link and cascaded splitters (2×2 plus 1×32), in both normal operation and protection mode.

3. Point-to-Multipoint Coherent Technology

With continuing increase of traffic and bandwidth being carried by CPONs, ensuring a reliable and robust connectivity has become critical to network operators. Emerging applications in the field of remote health monitoring, telerobotic surgery, autonomous cars, home security and other fields require uninterrupted access service to the end user. Although there are many existing optical protection and restoration architectures in the backbone and metro networks, the present cable optical access networks are poorly protected. In this invention, we proposed multiple protection schemes targeting optical access networks that are adopting coherent PON technologies.

3.1 Example CPON Protection Designs

Figure 16:
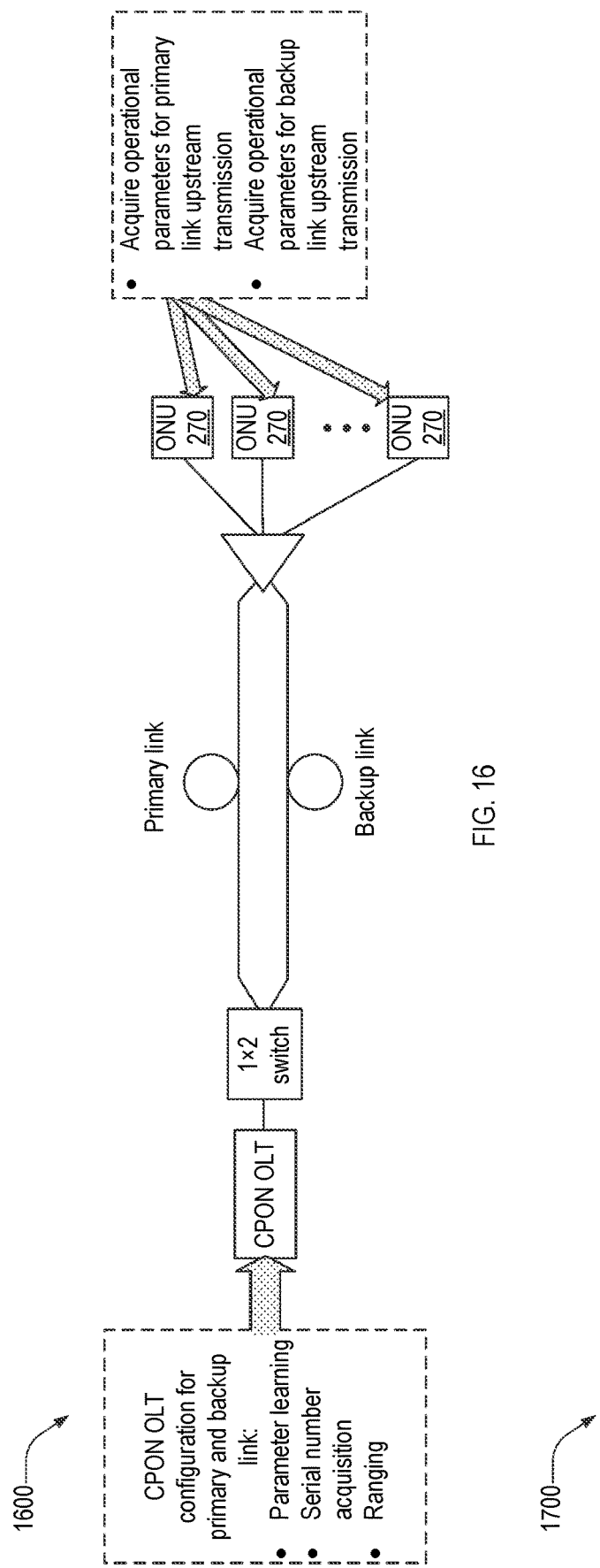
FIG. 16 is a schematic of a protection design that includes a hub-side optical switch, in an embodiment.
Figure 17:
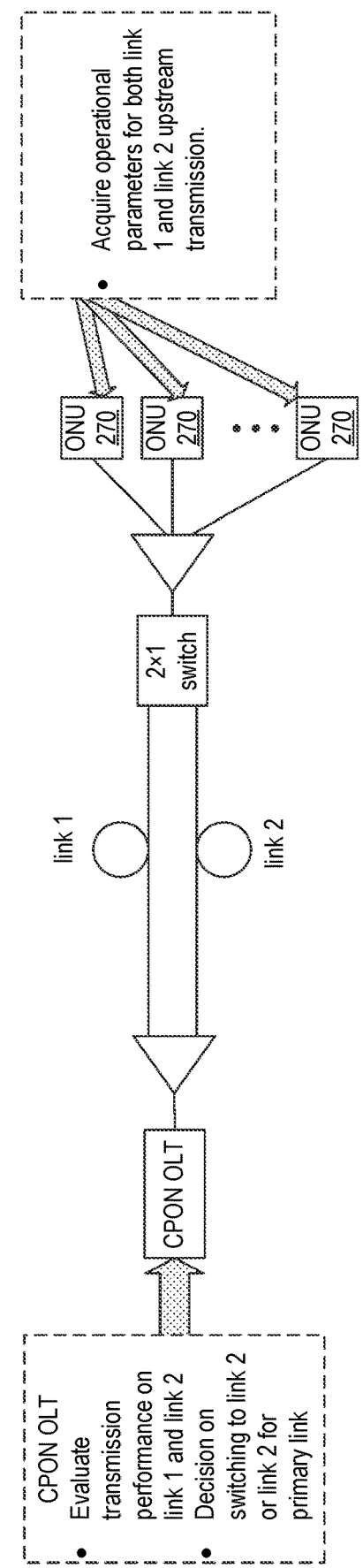
FIG. 17 is a schematic of a protection design that includes a node-side optical switch, in an embodiment.

FIGS. 16 and 17 are schematics of protection plans in a CPON network with one CPON OLT and multiple CPON ONUs. The protection is mainly targeted to provide redundancy to the trunk fiber, which is the segment that connects the OLT and remote passive splitting node.

FIG. 16 shows a schematic of a protection design 1600 for CPON network protection with trunk fiber redundancy design in a 1:1 configuration. Under normal operation, the traffic is sent to the ONUs over the primary link. No traffic or only low priority traffic is sent over the backup link. When the primary link fails, all traffic will be switched to the backup link. A 1×2 optical switch is utilized to select the optical path for the optical distribution network (ODN).

Three phases including parameter learning, serial number acquisition and ranging in the activation process are implemented in the initial learning parameter phase for the CPON OLT, for both the primary and the backup link. On the other hand, each ONU will acquire operational parameters for both the primary and the backup link upstream transmission. In the initialization process, OLT should have the parameters of backup link stored in its table. When the switch takes action, the round-trip time (different delay between primary and backup links) is automatically adjusted. When the primary link fail is detected, the OLT sends control signal to the optical switch via in-band control or a separate supervisory channel.

In FIG. 17 is a schematic of a protection design 1700, which is a 1+1 configuration design for a CPON network with one OLT and multiple ONUs. Similar to the 1:1 configuration, the 1+1 design also features two fiber links as redundancy and protection of the trunk fiber link. In this design, the downstream signal from the OLT is split into two paths by a passive optical splitter, the traffic is sent over two parallel paths. On the other side of the network, a 2×1 optical switch will select signal from one of the two fiber links based on signal quality and transmission performance. Different from the 1:1 configuration, in this 1+1 design downstream signal is always transmitted in parallel in both fiber links. Initial OLT configuration evaluates signal transmission performance on fiber link 1 and 2 and makes a decision on switching to the link with better signal quality for a normal operation condition. The ONUs also acquire operational parameters for both link 1 and link 2 upstream transmission. The switch can be controlled by the OLT through in-band control. The trade-off for the 1+1 design compared with the 1:1 design is that it requires an intelligent device that performs switching at an intermediate location that needs powering.

Figure 18:
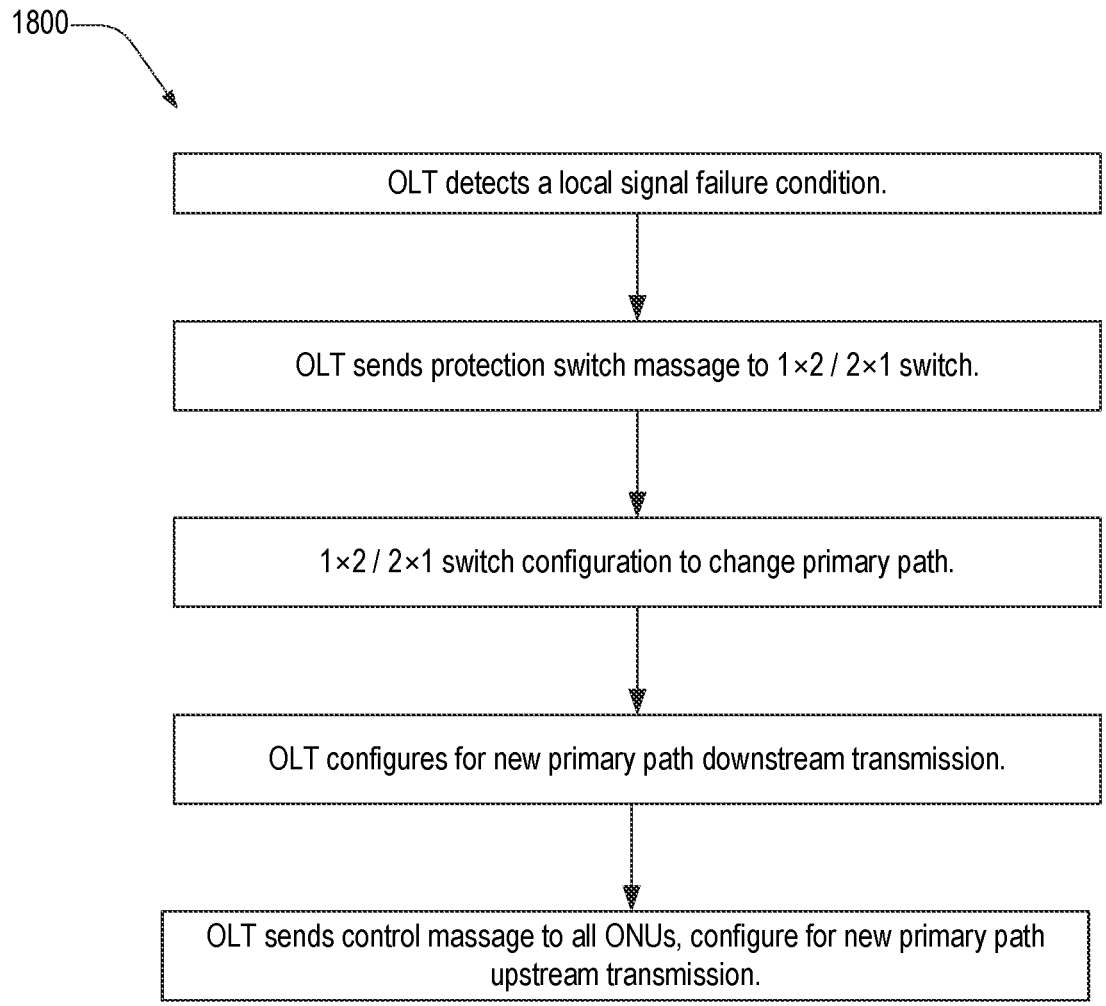
FIG. 18 is a flowchart illustrating a protection switching method applicable to protection designs of FIGS. 16 and 17, in an embodiment.

FIG. 18 is a flowchart illustrating a protection switching method 1800, for when failure occurs on the normal transmission paths of protection designs 1600 and 1700. For the 1:1 and 1+1 configurations, the switching process is similar. First the OLT detects the link failure, after a hold-off time interval, the OLT will send a protection switch message to the 1×2 optical switch (1:1 configuration) or the 2×1 optical switch (1+1 configuration). The 1×2 or the 2×1 optical switch will then reconfigure itself to change the optical path. The OLT will switch to the configuration for the alternative path transmission. Eventually the OLT will send a control message to all the ONUs, the ONUs will configure to the new optical path for upstream transmission. Note that the alternative path information is stored in the ONUs during the initial configuration process, when a link fails, the ONUs can be switched to the alternative path configuration immediately, without requiring of accessing the new path from scratch.

Figure 19:
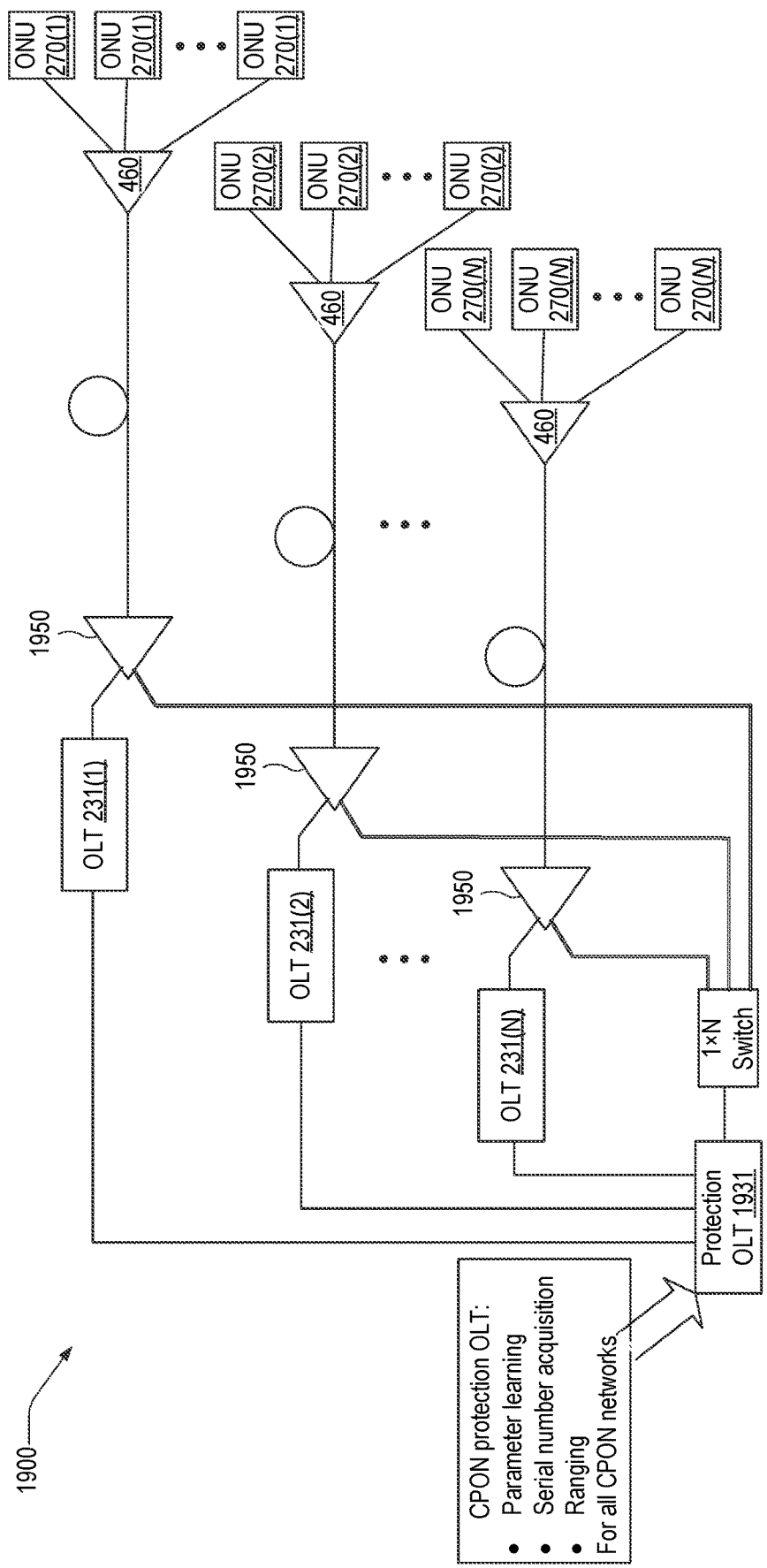
FIG. 19 is a schematic of a 1:N CPON protection design, in an embodiment.

FIG. 19 is a schematic of a 1:N CPON protection design 1900. In this design, there are N OLTs 231 in the same central office, or in proximity, and each of the N OLTs supports a respective CPON network. An extra OLT, designated as a protection OLT 1931, provides redundancy and protection to each of the N OLTs 231. Protection OLT 1931 is connected to all the CPON networks via a 1×N optical switch and N optical splitters (2×1 configuration). Each CPON network includes a 2×1 passive optical splitter 1950, an input port thereof being connected to protection OLT 1931. Protection OLT 1931 is also connected to the other OLTs via separate respective OLT interconnects.

Protection design 1900 provides redundancy and protection to the OLTs. Initially, protection OLT 1931 is configured for all the CPON networks it will potentially support. Under normal operation, the 1×N optical switch is closed, and each OLT supports only its corresponding CPON network. When one of the OLTs detects malfunction, this OLT stops transmitting downstream traffic, and sends a protection switching message to protection OLT 1931. Protection OLT 1931 is then configured to support the corresponding CPON network and send a switching message to the 1×N switch. The 1×N switch will open the corresponding port, and then protection OLT 1931 transmits downstream traffic to the CPON network.

Each CPON network of FIG. 19 includes a plurality of ONUs 270. The settings of ONU 270 may be stored in a controller working with protection OLT 1931. In this case, protection OLT 1931 need not learn, through a lengthy initialization and ranging process, the settings of the new set of ONUs that is serving. When a link fails the specific settings can be passed along to protection OLT 1931. In a highly integrated system where multiple OLTs are integrated together the OLT transmitter functionality could be decoupled from the OLT processing functionality. This would make the redundancy scheme presented here more seamless.

Figure 20:
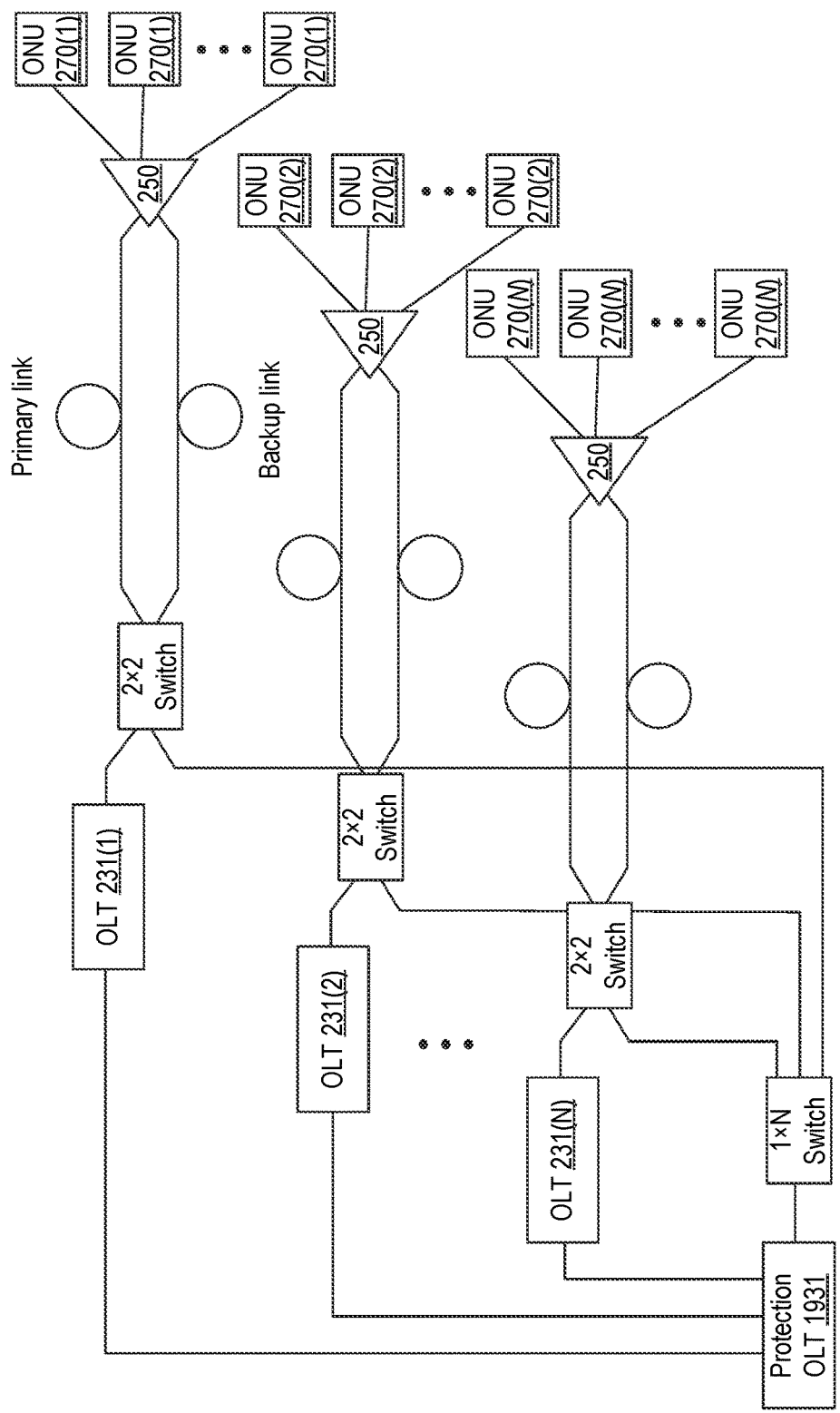
FIG. 20 is a schematic of a protection design, which features redundancy design for both OLTs and the trunk fiber links, in an embodiment.

Protection design 1900 provides redundancy to the OLTs, but not to trunk fiber links. FIG. 20 is a schematic of a protection design 2000, which features redundancy design for both OLTs 231 and the trunk fiber links. This design utilizes a combination of 1:N and 1:1 protection configurations. In addition to the 1:N design which protects OLTs 231, 1:1 redundancy links in each of the CPON networks are added to protect the trunk fiber links. Protection OLT 1931 is connected to each CPON network via a 1×N optical switch and a corresponding 2×2 optical switch. The operating process is similar to the 1:N configuration, with an addition of protection switching message sent to the 2×2 optical switch. The process will be discussed in more details in FIG. 22.

Figure 21:
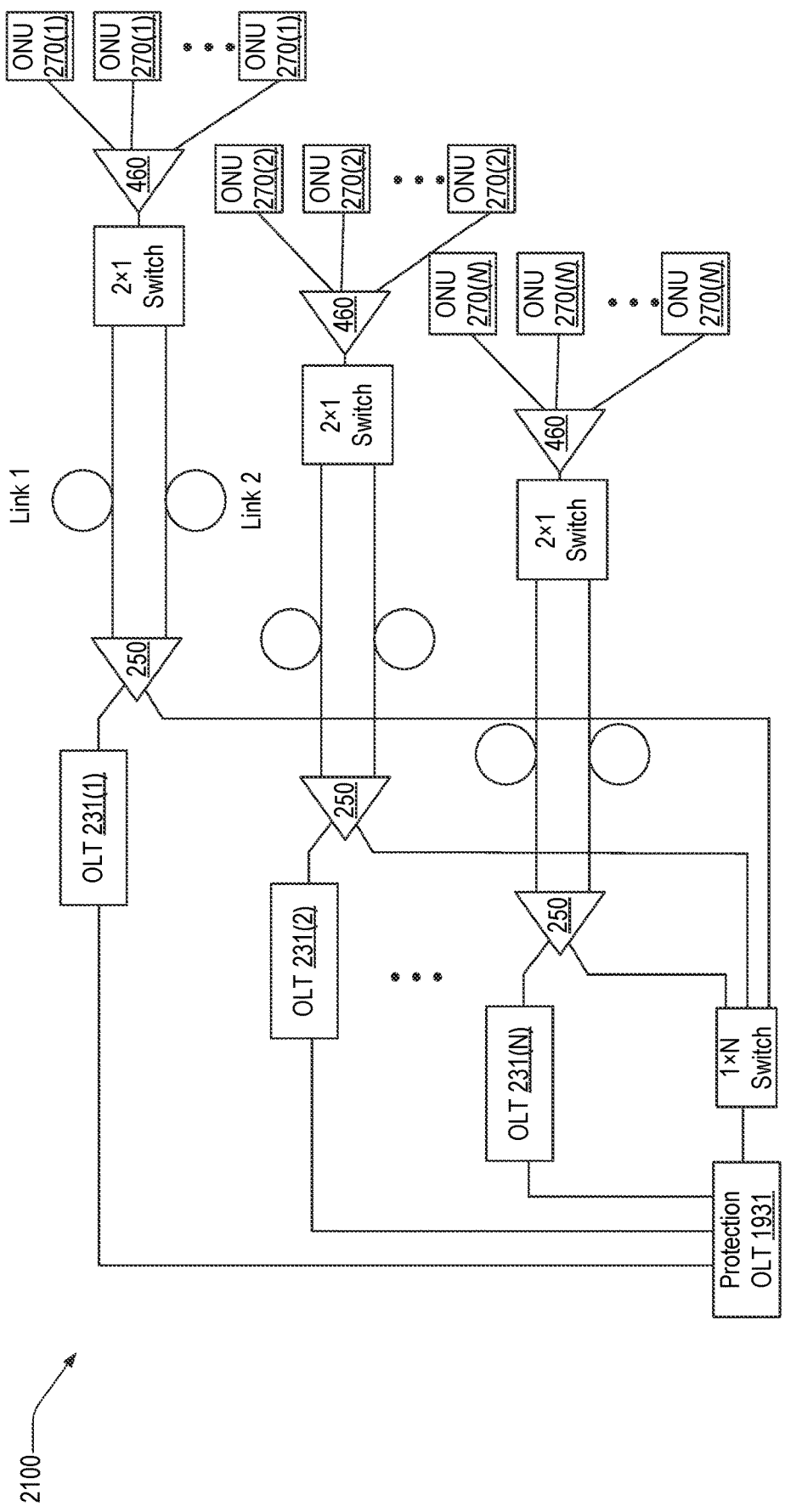
FIG. 21 is a schematic of a CPON protection design, which features a combination of 1:N and 1+1 protection configurations, in an embodiment.

FIG. 21 is a schematic of a CPON protection design 2100, which features a combination of 1:N and 1+1 protection configurations, offers protection to both OLTs 231 and trunk fiber links. In addition to the 1:N design which protects the OLTs 231, 1+1 redundancy links in each of the CPON networks are added to protect the trunk fiber links. Protection OLT 1931 is connected to each CPON network via a 1×N optical switch and a corresponding 2×1 passive optical splitter. Switching between the primary and the backup links is done by the 2×1 optical switches. The operating process is similar to the 1:N configuration, with an addition of protection switching message sent to the 2×1 optical switch.

Figure 22:
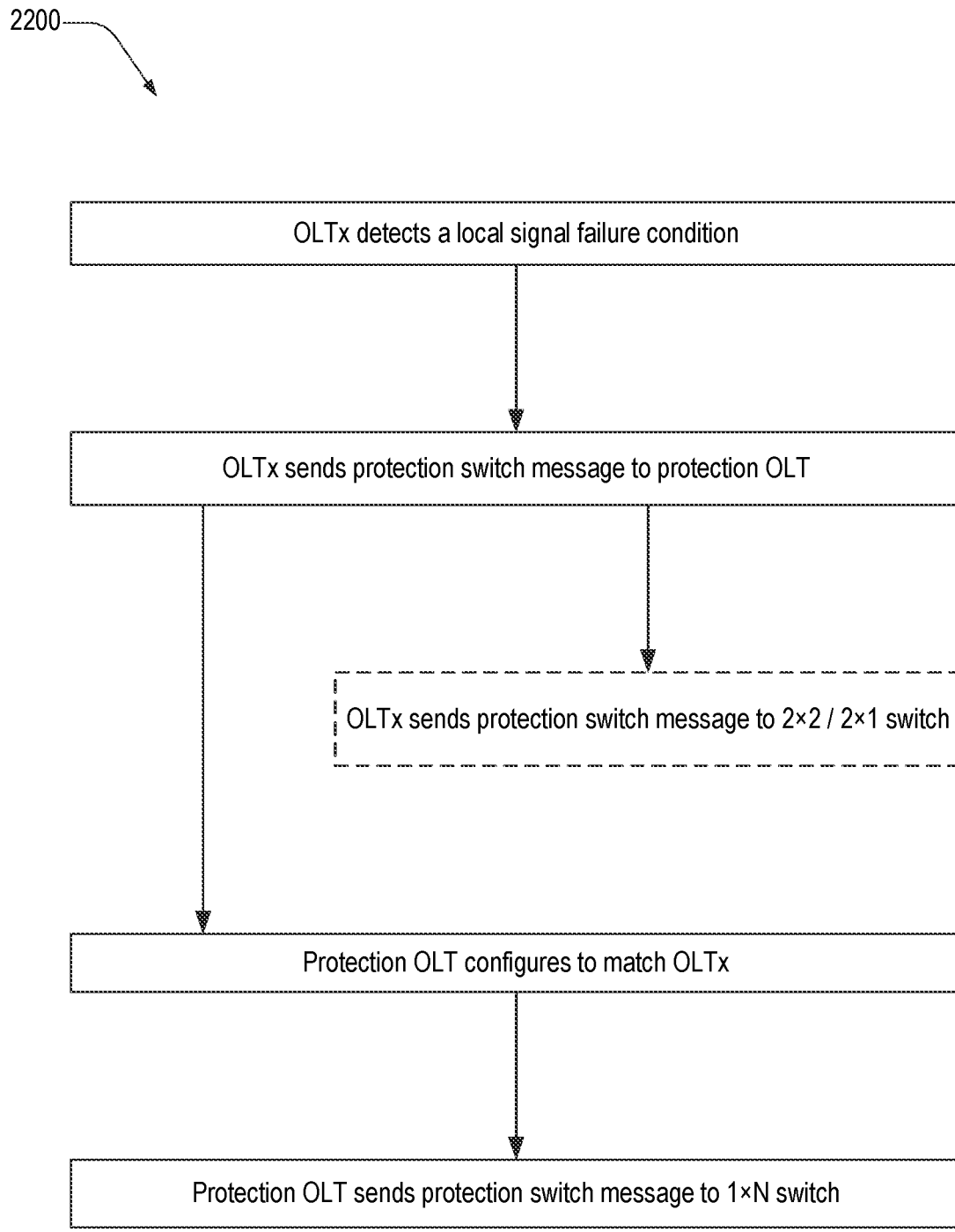
FIG. 22 is a flowchart illustrating an embodiment of a protection switching process that is applicable to CPON protection designs of FIGS. 19-21.

FIG. 22 is a flowchart illustrating a protection switching process 2200 that is applicable to CPON protection designs 1900, 2000, and 2100. When one of the OLTs (OLTx) detects malfunction, this OLT will stop transmitting downstream traffic, and send a protection switching message to protection OLT 1931. For CPON protection designs 2000 and 2100, protection OLT 1931 will send a switching message to either the 2×2 optical switch (for protection design 2000), or the 2×1 optical switch (for protection design 2100). Protection OLT 1931 is then configured to match OLTx and support the corresponding CPON network. Protection OLT 1931 will also send a switching message to the 1×N switch. The 1×N switch will open the corresponding port, then protection OLT 1931 will transmit downstream traffic to the CPON network.

Figure 23:
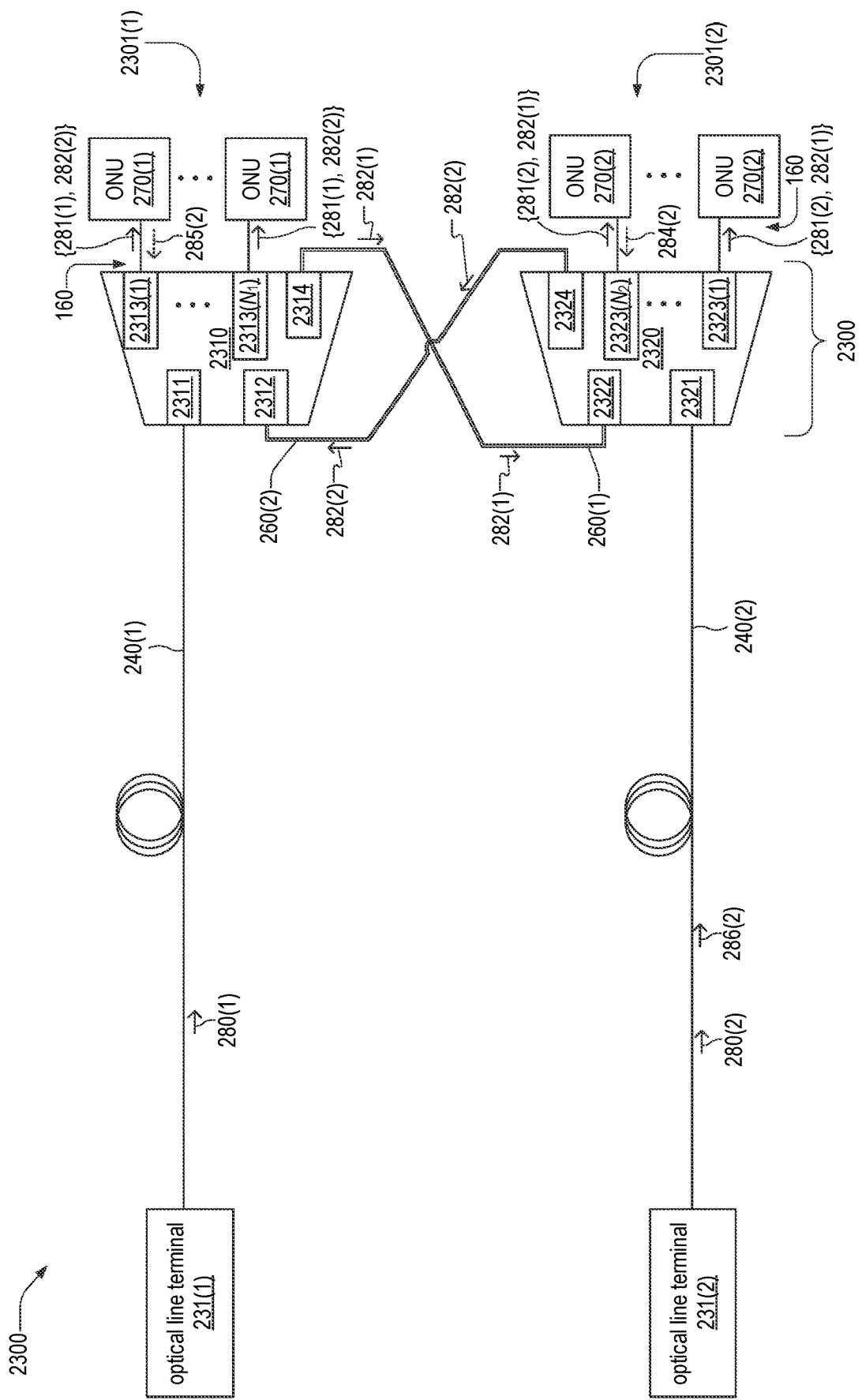
FIG. 23 is a schematic of a first redundancy link in a use scenario in which it includes, and connects, components of two optical networks, in an embodiment.

FIG. 23 is a schematic of a redundancy link 2300 in a use scenario in which it includes, and connects, components of optical networks 2301(1) and 2301(2), which include OLTs 231(1) and 231(2) respectively. Redundancy link 2300 includes passive optical splitters 2310 and 2320, which are part of optical network 2301(2) and 2301(2), respectively. Protection design 200, passive optical splitter 250(1), and passive optical splitter 250(2) are respective examples of redundancy link 2300, optical splitter 2310, and optical splitter 2320. FIG. 23 illustrates signals 280, 281, 282, 284, 285, and 286 introduced in the discussion of protection design 200 of FIGS. 2 and 3. Protection design 200 is an example of redundancy link 2300, these signals serve the same function in redundancy link 2300 as they do in PON protection design 200.

Optical splitter 2310 may be part of, or function as, an aggregation node of optical network 2301(1). Optical splitter 2310 includes (i) a hub-side splitter-port 2311 that optically couples to OLT 231(1), a hub-side splitter-port 2312, (iii) a plurality of node-side splitter-ports 2313(1-$N_1$) each optically coupled to the hub-side splitter-ports 2311 and 2312, (iii) a failover-mode port 2314 coupled to hub-side splitter-port 2311. Failover-mode port 2314 may also be optically coupled to hub-side splitter-port 2312. In embodiments, port 2314 is not optically coupled to 2312, such that ONUs 270(1) do not receive multipath signals derived from signal 282(1).

Optical splitter 2320 may be part of, or function as, an aggregation node of optical network 2301(2). Optical splitter 2320 includes (i) a hub-side splitter-port 2321 that optically couples to OLT 231(2), a hub-side splitter-port 2322 optically coupled to the failover-mode port 2314, (iii) a plurality of node-side splitter-ports 2323(1-$N_2$) each optically coupled to hub-side splitter-ports 2321 and 2322, (iii) a failover-mode port 2324 coupled to hub-side splitter-port 2321 and to hub-side splitter-port 2312. Failover-mode port 2324 may also be optically coupled to hub-side splitter-port 2322. In embodiments, port 2324 is not optically coupled to port 2322, such that ONUs 270(2) do not receive multipath signals derived from signal 282(2).

In embodiments, redundancy link 2300 includes protection optical-fiber links 260(1) and 260(2). Protection optical-fiber link 260(2) is coupled between hub-side splitter-port 2312 and failover-mode port 2324. Protection optical-fiber link 260(1) is coupled between hub-side splitter-port 2322 and failover-mode port 2314. Redundancy link 2300 may include at least one of OLTs 231(1) and 231(2).

Figure 24:
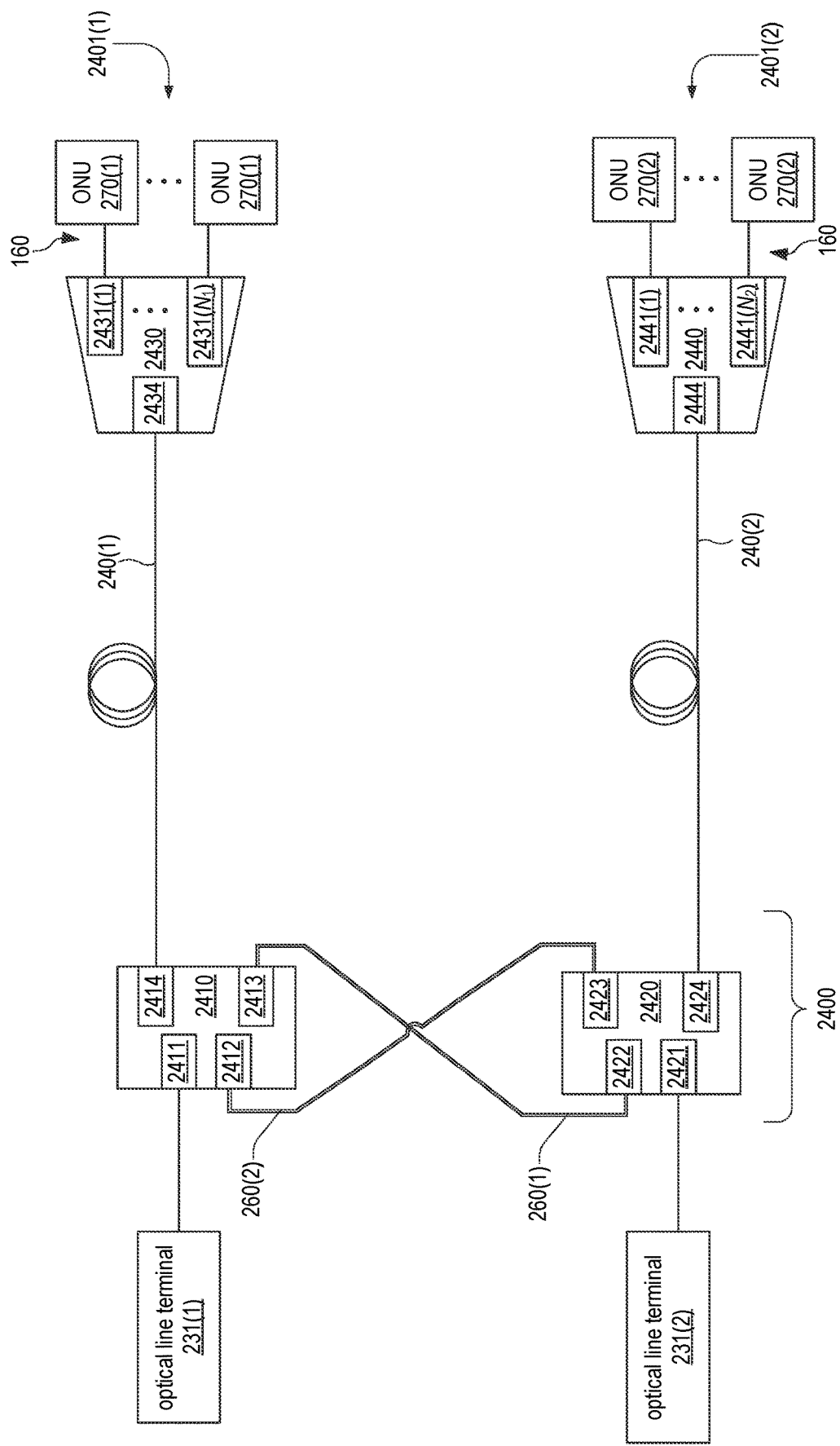
FIG. 24 is a schematic of a second redundancy link in a use scenario in which it includes, and connects, components of two optical networks, in an embodiment.

FIG. 24 is a schematic of a redundancy link 2400 in a use scenario in which includes, and connects, components of optical networks 2401(1) and 2401(2). Redundancy link 2400 includes fiber-optic components 2410 and 2420, which are part of optical networks 2401(1) and 2401(2), respectively. Protection designs 400 and 600 are examples of redundancy link 2400.

Fiber-optic component 2410 includes (i) a hub-side port 2411 that optically couples to OLT 231, (ii) a hub-side port 2412, (iii) a node-side port 2413 optically coupled to each of hub-side ports 2411 and 2412; and (iv) a node-side port 2414 optically coupled to each of hub-side ports 2411 and 2412. Fiber-optic component 2420 includes (i) a hub-side port 2421 that optically couples to OLT 231(2), (ii) a hub-side port 2422 optically coupled to node-side port 2413, (iii) a node-side port 2423 optically coupled to the hub-side ports 2412, 2421, and 2422, and (iv) a node-side port 2424 optically coupled to each of the hub-side ports 2421 and 2422.

In embodiments, each of fiber-optic components 2410 and 2420 is a passive optical splitter, such as passive splitter 450. FIG. 4. In such embodiments, node-side ports 2413 and 2414 are fixedly coupled to each of hub-side ports 2411 and 2412, and node-side ports 2423 and 2424 are fixedly coupled to each of hub-side ports 2421 and 2422.

In embodiments, each of fiber-optic components 2410 and 2420 is an optical switch, such as switch 650, FIG. 6. In such embodiments, node-side port 2413 and node-side port 2414 are switchably coupled to each of hub-side ports 2411 and 2412, and node-side port 2423 and node-side port 2424 are switchably coupled to each of the hub-side ports 2421 and 2422.

Each of fiber-optic components 2410 and 2420 may be a multi-cast optical switch. In such embodiments, during normal operation, hub-side splitter-ports 2411 and 2421 are coupled to respective node-side ports 2414 and 2424. When OLT 231(2) fails, hub-side splitter-port 2411 is optically coupled to both node-side ports 2413 and 2414. Similarly, when OLT 231(1) fails, hub-side splitter port 2421 is optically coupled to both node-side ports 2423 and 2424 simultaneously.

Redundancy link 2400 may include at least one of protection fiber-optic link 260(2) optically coupling hub-side port 2412 to node-side port 2423, and protection fiber-optic link 260(2) optically coupling hub-side port 2422 to node-side port 2413. Redundancy link 2400 may include at least one of OLTs 231(1) and 231(2).

Optical network 2401(1) includes OLT 231(1), fiber-optic component 2410, and an optical splitter 2430, of which optical splitter 460 is an example. OLT 231(1) is optically coupled to hub-side port 2411. Optical splitter 2430 may be part of, or function as, an aggregation node of optical network 2401(1).

Optical splitter 2430 includes a plurality of node-side splitter-ports 2431, $N_1$ in number, and a hub-side splitter-port 2434. Hub-side splitter-port 2434 is optically coupled to node-side port 2414 and to each splitter-port 2431. Optical network 2401(1) may include optical fiber link 240(1), which optically couples node-side port 2414 to hub-side splitter-port 2434. Optical network 2401 may also include ONUs 270(1) each coupled to a respective node-side splitter-port 2431, e.g., by a respective optical fiber 160.

Optical network 2401(2) includes OLT 231(2), fiber-optic component 2420, and an optical splitter 2440. OLT 231(2) is optically coupled to hub-side port 2421. Optical splitter 2440 may be part of, or function as, an aggregation node of optical network 2401(2). When OLTs 231(1) and 231(2) may operate at the same wavelength, e.g., when they are located in a same central office, or OLTs 231(1) and 231(2) may operate at different wavelengths, e.g., when they are located in different central offices.

Optical splitter 2440 includes a plurality of node-side splitter-ports 2441, $N_2$ in number, and a hub-side splitter-port 2444. Hub-side splitter-port 2444 is optically coupled to node-side port 2424 and to each splitter-port 2441. Optical network 2401(2) may include optical fiber link 240(2), which optically couples node-side port 2424 to hub-side splitter-port 2444. Optical network 2401(2) may also include ONUs 270(2) each coupled to a respective node-side splitter-port 2441, e.g., by a respective optical fiber 160.

Figure 25:
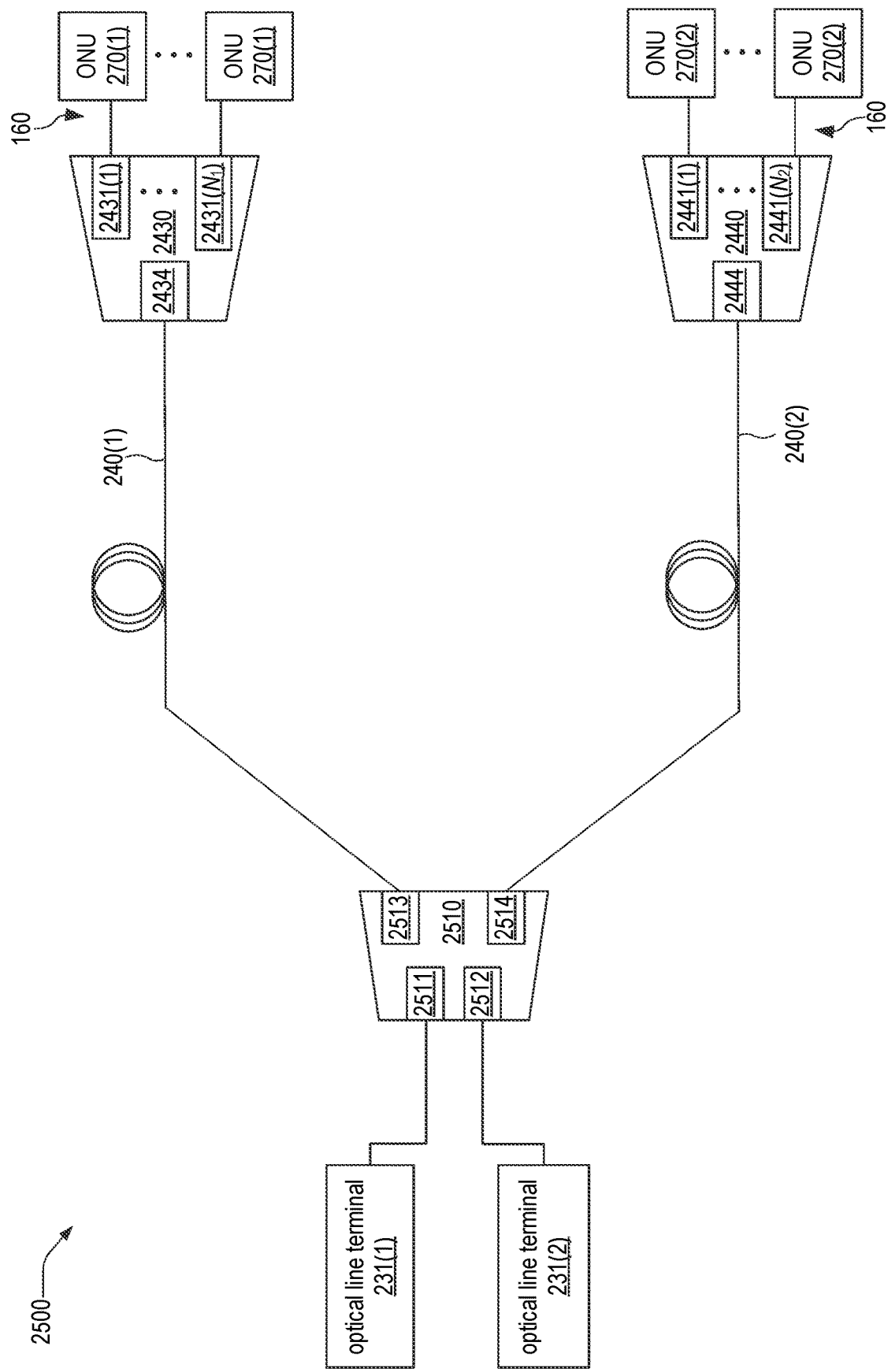
FIG. 25 is a schematic of an optical network that includes a hub-side optical splitter, in an embodiment.

FIG. 25 is a schematic of an optical network 2500 that includes a hub-side optical splitter 2510. Optical network 2500 may also include at least one of node-side optical splitter 2430, node-side optical splitter 2440, OLTs 231, ONUs 270(1), and ONUs 270(2). When included, optical splitters 2430 and 2440 are part of, or function as, respective aggregation nodes of optical network 2500.

Hub-side optical splitter 2510 includes a hub-side splitter-port 2511 that optically couples to OLT 231(1), a hub-side splitter-port 2512 that optically couples to OLT 231(2), and node-side splitter-port 2513 and 2514. Each of splitter-ports 2513 and 2514 are optically coupled to both splitter-ports 2511 and 2512. When optical network 2500 includes optical splitter 2430, node-side splitter-port 2513 is optically coupled to hub-side splitter-port 2434, e.g., by optical fiber link 240(1). When optical network 2500 includes optical splitter 2440, node-side splitter-port 2514 is optically coupled to hub-side splitter-port 2444, e.g., by optical fiber link 240(2).

During a normal mode of operation, optical network 2500 operates at both wavelengths $\lambda_1$ and $\lambda_2$. For example, OLTs 231(1) and 231(2) operate at wavelengths $\lambda_1$ and $\lambda_2$, respectively, and each ONU 270 receives signals from both OLTs 231. When both OLTs 231 are functioning properly, transceivers of ONUs 270(1) and 270(2) are tuned to wavelengths $\lambda_1$ and $\lambda_2$, respectively. When one OLT is down, OLT 231(1) for example, each ONU 270(1) tunes its transceiver to wavelength $\lambda_2$, such that optical network 2500 operates at wavelength $\lambda_2$ only.

Figure 26:
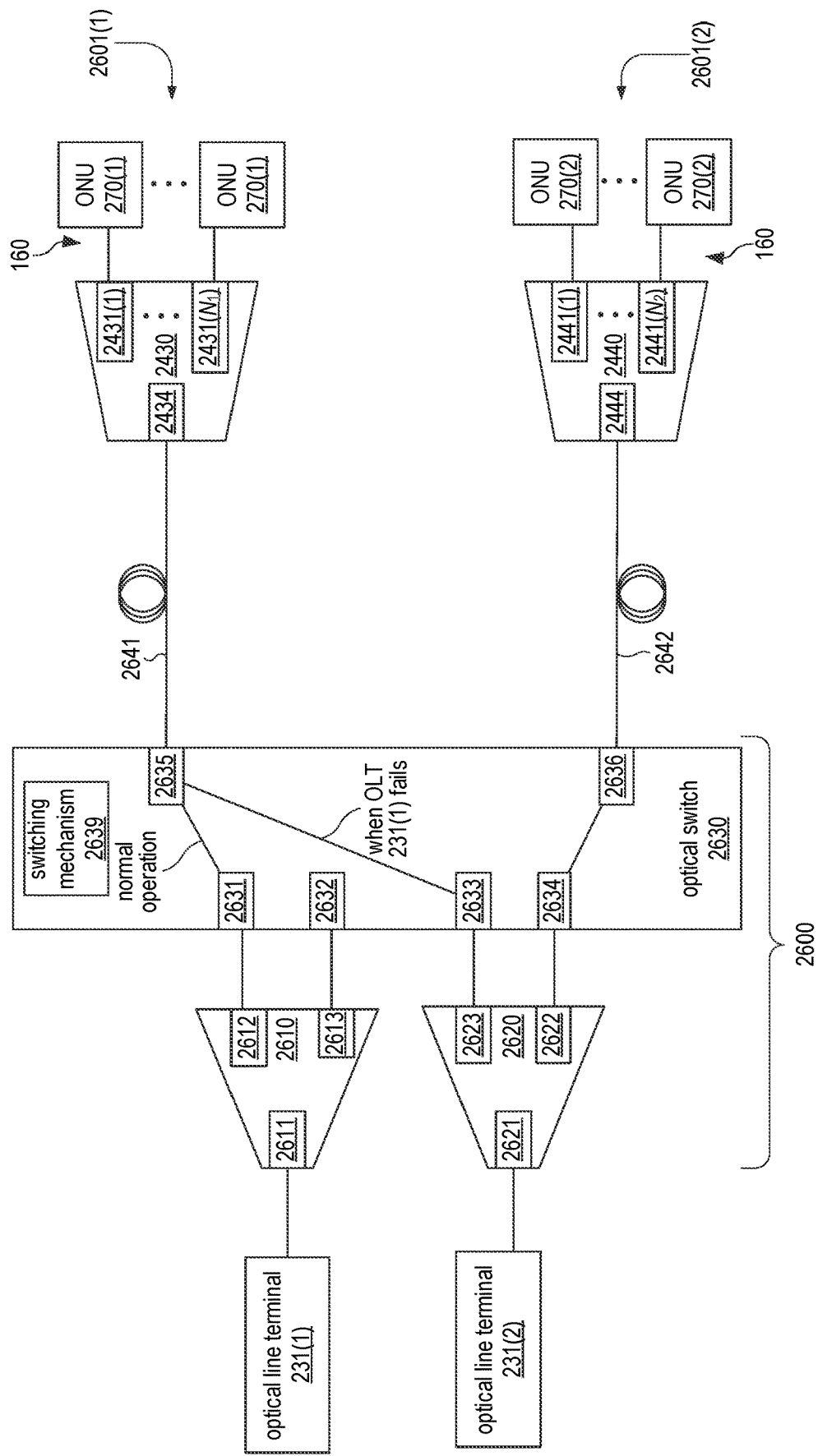
FIG. 26 is a schematic of a first network resiliency architecture that includes, and connects, components of two optical networks, in embodiments.

FIG. 26 is a schematic of a network resiliency architecture 2600 in a use scenario which includes, and connects, components of optical networks 2601(1) and 2601(2). Resiliency architecture 2600 includes an optical splitter 2610, an optical splitter 2620, and an optical switch 2630. Optical network 2601(1) includes OLT 231(1), optical splitter 2610, optical link 2641, optical splitter 2430, and ONUs 270(1). Optical network 2601(2) includes OLT 231(2), optical splitter 2620, backup optical link 2742, optical splitter 2440, and ONUs 270(2).

Primary optical link 2641 couples the output port 2635 to optical splitter 2430 at hub-side splitter-port 2434. Primary optical link 2642 couples output port 2636 to optical splitter 2440 at hub-side splitter-port 2444. Primary optical links 2641 and 2642 may be part of resiliency architecture 2600.

Splitters 2610 and 2620 are part of optical networks 2601(1) and 2601(2), respectively. Optical splitter 2610 includes a hub-side splitter-port 2611 that optically couples to an OLT 231(1), a node-side splitter-ports 2612 and 2613, each of which are optically coupled to hub-side splitter-port 2611. Optical splitter 2620 includes a hub-side splitter-port 2621 that optically couples to an OLT 231(2), a node-side splitter-ports 2622 and 2623, each of which are optically coupled to hub-side splitter-port 2621.

Optical switch 2630 includes input ports 2631-2634 and output ports 2635 and 2636. Input ports 2631-2634 are optically coupled to splitter-ports 2612, 2613, 2623, and 2622, respectively. Output port 2635 optically couples to optical splitter 2430. Output port 2636 optically couples to optical splitter 2440. Optical splitter 2430 may be part of, or function as, an aggregation node of optical network 2601(1). Optical splitter 2440 may be part of, or function as, an aggregation node of optical network 2601(2).

Optical switch 2630 includes a switching mechanism 2639 that routes an optical signal from one of input ports 2631-2634 to one of output ports 2635 and 2636. Switching mechanism 2639 may include at least one of (i) microelectromechanical mirrors, (ii) a liquid-crystal polarizer, (iii) a liquid-crystal-on-silicon beam steerer, and (iv) tunable optical resonators.

FIG. 26 denotes an optical network 2601(2), which includes resiliency architecture 2600, OLTs 231, node-side optical splitters 2430 and 2440, and optical links 2641 and 2642. Primary optical link 2641 couples the output port 2434 to hub-side splitter-port 2434. Primary optical link 2642 couples output port 2636 to hub-side splitter-port 2444.

When OLTs 231 and optical links 2641 and 2642 are properly operating, both OLTs 231 operate at the wavelength at which each of ONUs 270(1) and 270(2) are tuned. In such a normal state of operation, optical switch 2630 is configured such that input ports 2631 and 2634 are coupled to output ports 2635 and 2636 respectively, such that ONUs 270(1) and ONUs 270(2) receive signals from OLTs 231(1) and 231(2), respectively.

When one of OLTs 231 fails, OLT 231(1) in the example shown in FIG. 2600, optical switch 2630 is configured such that (i) input port 2633 is coupled to output port 2635 and (ii) as in the normal mode, input port 2634 is coupled to output port 2636. In embodiments, when OLT 231(1) fails, switching mechanism 2639 couples input port 2633 to output port 2635. Similarly, when OLT 231(2) fails, optical switch 2630 is configured such that (i) input port 2631 is coupled to output port 2635 as in the normal mode and (ii) input port 2632 is coupled to output port 2636. In embodiments, when OLT 231(2) fails, switching mechanism 2639 couples input port 2632 to output port 2636.

Figure 27:
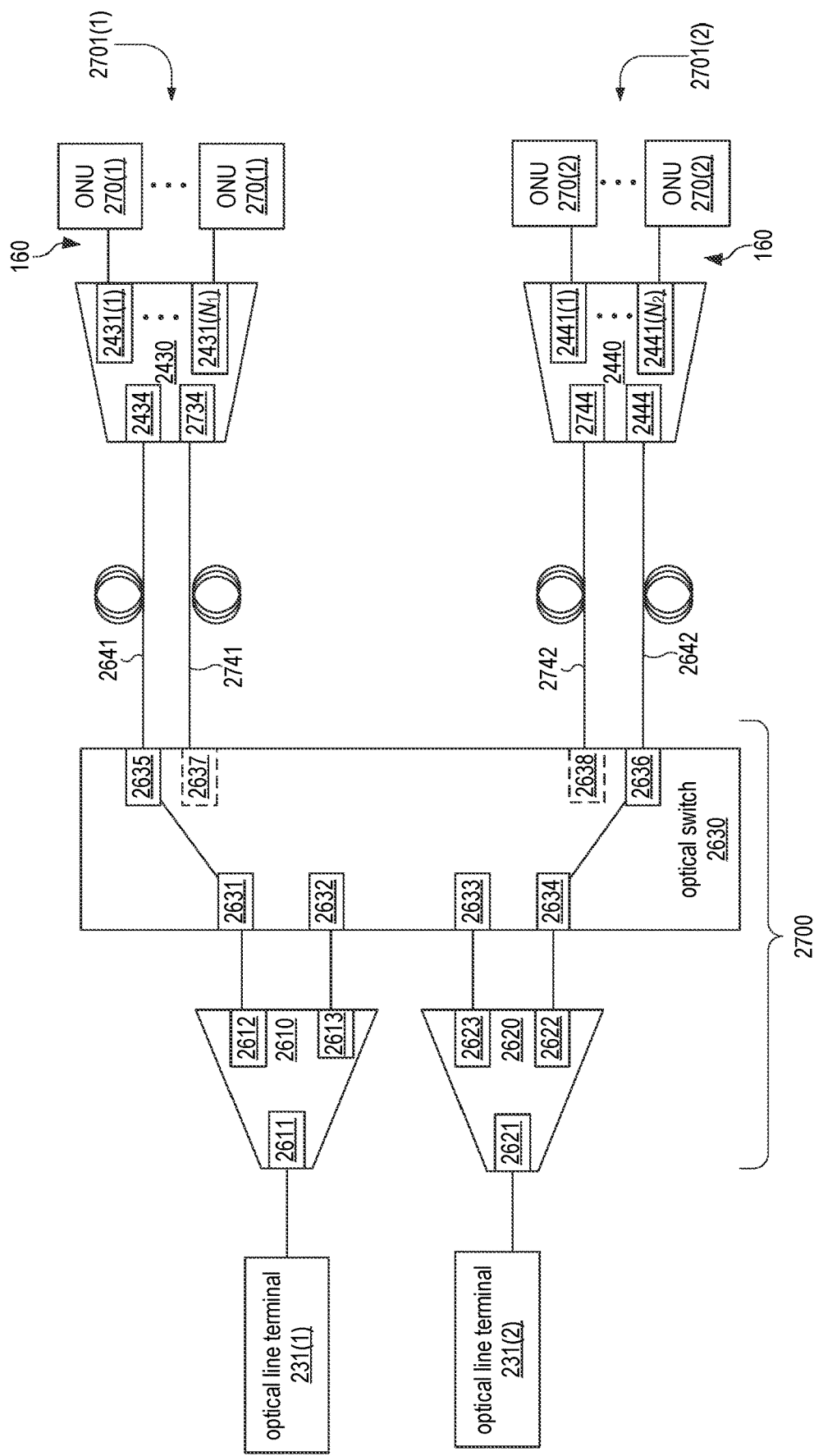
FIG. 27 is a schematic of a second network resiliency architecture that includes, and connects, components of two optical networks, in embodiments.

FIG. 27 is a schematic of a network resiliency architecture 2700 in a use scenario which includes, and connects, components of optical networks 2701(1) and 2701(2). Network resiliency architecture 2700 and networks 2701 are similar to resiliency architecture 2600 and networks 2601, where differences include: (i) optical splitters 2430 and 2440 have additional node-side splitter-ports 2734 and 2744 respectively, and (ii) optical switch 2630 includes additional output ports 2637 and 2638. Output port 2637 optically couples to optical splitter 2430 at port 2734, and output port 2638 optically couples to optical splitter 2440 at port 2744. Resiliency architecture 2700 may also include primary optical links 2641 and 2642, and backup optical links 2741 and 2742. Backup optical link 2741 couples output port 2637 to optical splitter 2430 at a hub-side splitter-port 2734. Backup optical link 2742 couples the output port 2636 to optical splitter 2440 at hub-side splitter-port 2744.

Figure 28:
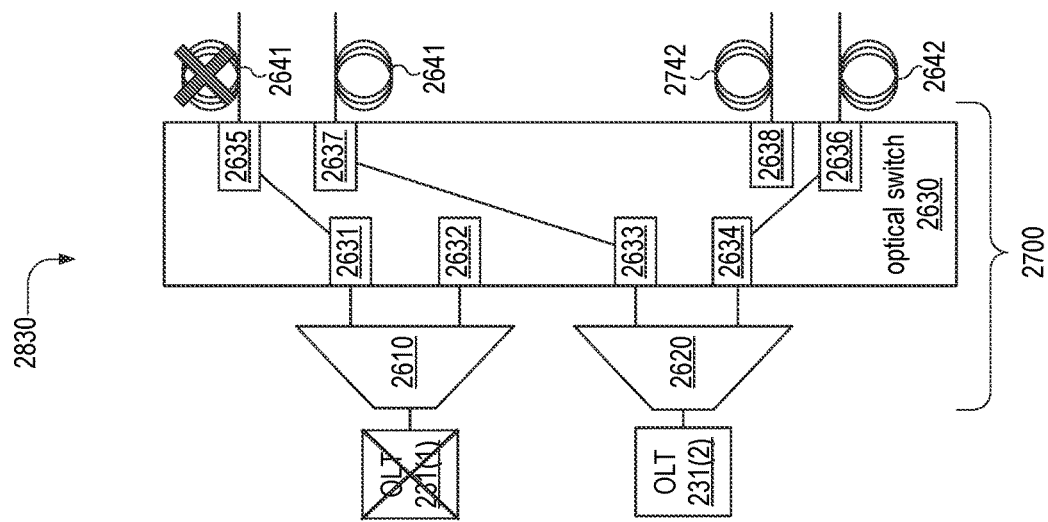
FIG. 28 illustrates network resiliency architecture of FIG. 27 in three network failure scenarios, in embodiments.
Figure 28:
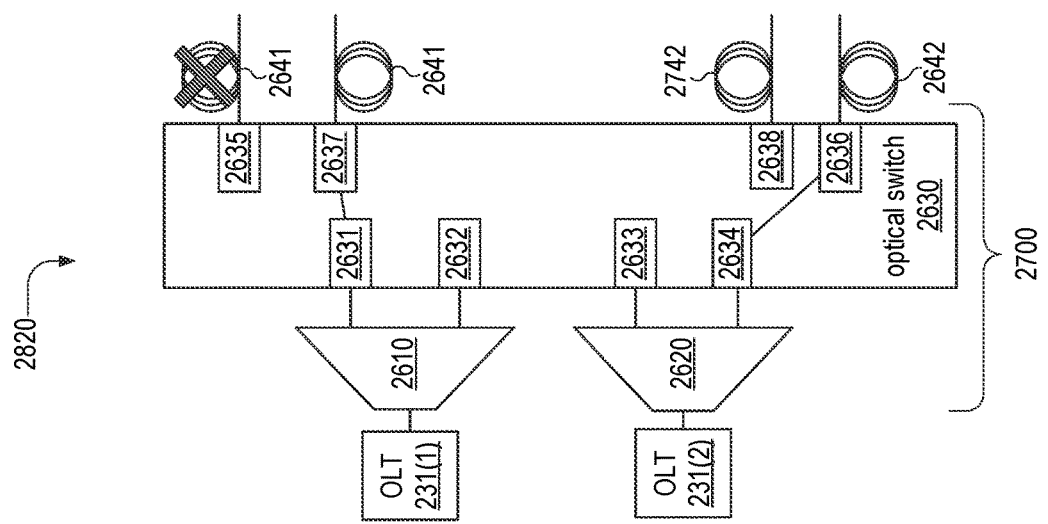
Figure 28:
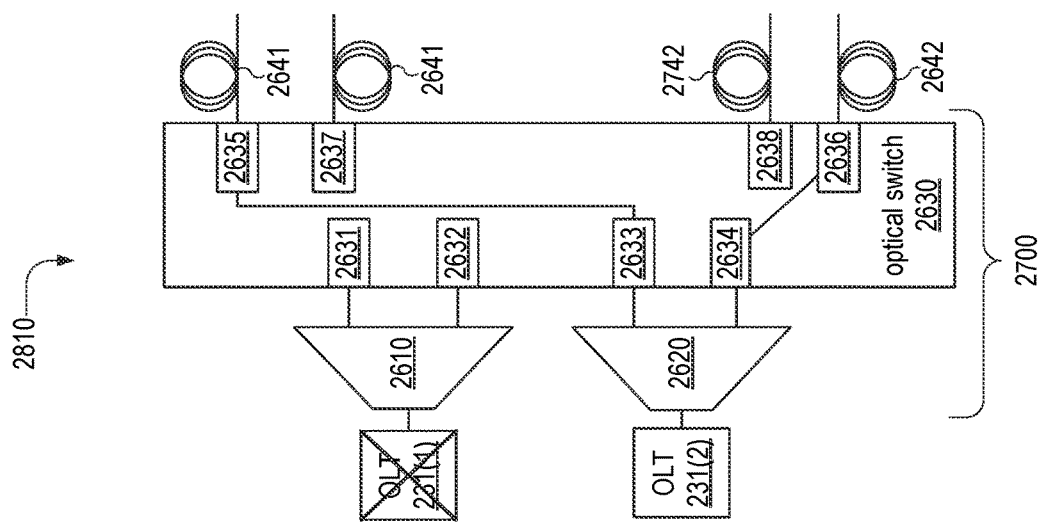

FIG. 28 illustrates network resiliency architecture 2700 in three network failure scenarios 2810, 2820, and 2830. In scenario 2810, OLT 231(1) has failed, such that the output port 2635 does not receive a signal from input port 2631 as it does under normal operation, shown in FIG. 27. In this scenario, optical switch 2630 configured such that (i) input port 2633 is coupled to output port 2635, such that ONUs 270(1) receive downlink signals from OLT 231(2).

In scenario 2820, optical link 2641 has failed, such that ONUs 270(1) cannot receive a signal from hub-side splitter-port 2434 of node-side optical splitter 2430. In this scenario, optical switch 2630 configured such that (i) input port 2631 is coupled to output port 2637, such that ONUs 270(1) receive downlink signals from OLT 231(1) via backup optical link 2641.

In scenario 2830, both OLT 231(1) and optical link 2641 have failed. In this scenario, optical switch 2630 configured such that (i) input port 2633 is coupled to output port 2637, such that ONUs 270(1) receive downlink signals from OLT 231(2) via backup optical link 2641.

Figure 29:
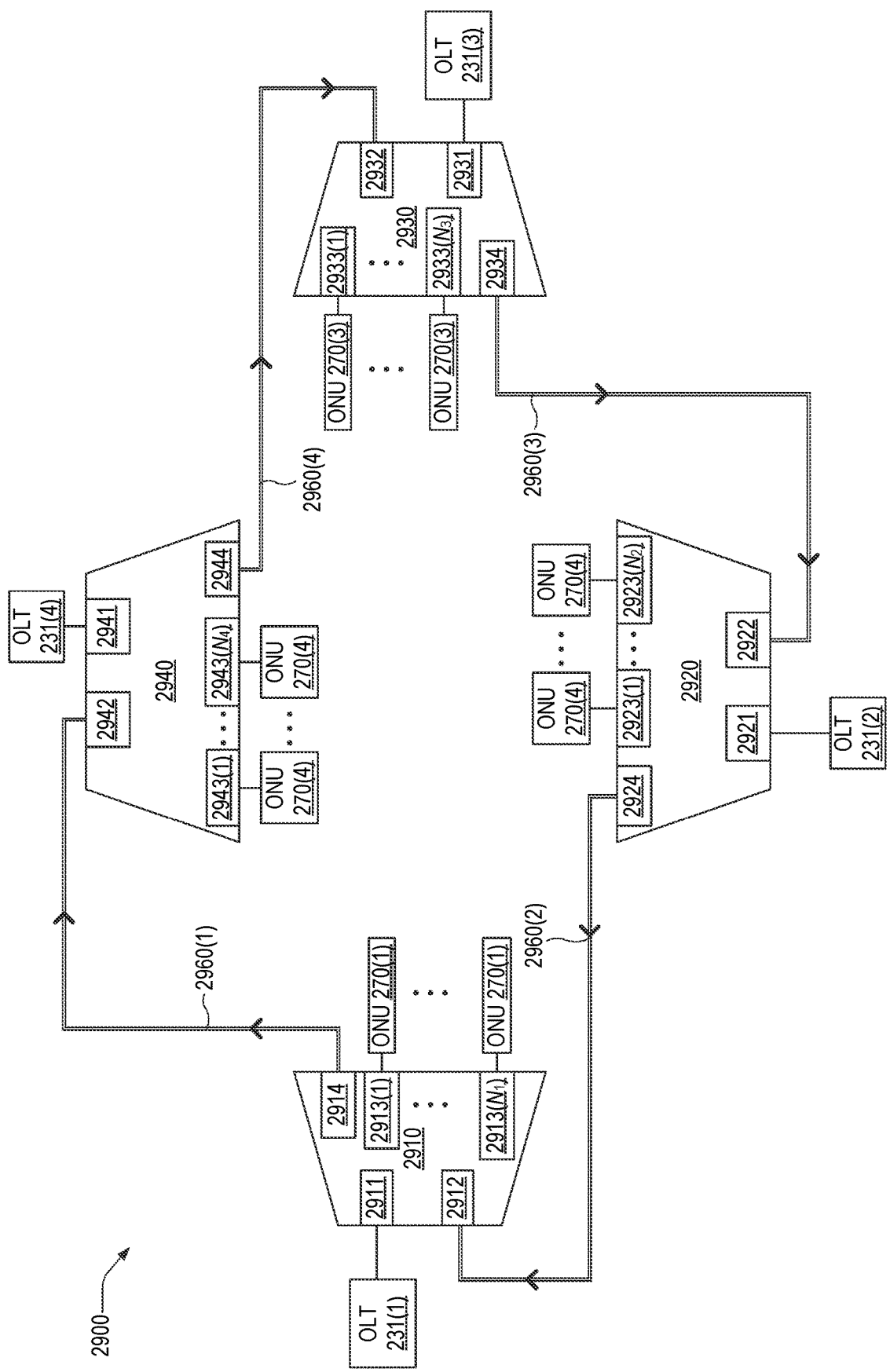
FIG. 29 is a schematic of a coherent passive optical network that includes redundancy links of FIG. 23 implemented in a ring topology, in an embodiment.

FIG. 29 is a schematic of a coherent passive optical network 2900 (hereinafter CPON 2900), where redundancy link 2300 of FIG. 23 is implemented in a ring topology. CPON 2900 includes optical splitters 2910, 2920, 2930, and 2940, each of which is an example of optical splitters 2310 and 2320. Optical splitters 2910, 2920, 2930, and 2940 include: (i) respective hub-side splitter-ports 2911, 2921, 2931, and 2941, which are examples of hub-side splitter-port 2311; (ii) respective hub-side splitter-ports 2912, 2922, 2932, and 2942, which are examples of hub-side splitter-port 2312, (iii) respective node-side splitter-ports 2913(1-$N_1$), 2923(1-$N_2$), 2933(1-$N_3$), and (iv) 2943(1-$N_4$) each of which are examples of a node-side splitter-port 2313; and which are examples of failover-mode port 2314.

CPON 2900 also includes $N_1$ ONUs 270(1) each coupled to a respective node-side splitter port 2913, $N_2$ ONUs 270(2) each coupled to a respective node-side splitter port 2923, $N_3$ ONUs 270(3) each coupled to a respective node-side splitter port 2933, and $N_4$ ONUs 270(4) each coupled to a respective node-side splitter port 2943.

CPON 2900 also includes optical fiber links 2960(1-4), each of which are examples of protection fiber-optic link 260. Optical fiber link 2960(1) connects ports 2914 and 2942, such that OLT 231(1) serves as a backup OLT for OLT 231(4). Optical fiber link 2960(2) connects ports 2924 and 2941, such that OLT 231(2) serves as a backup OLT for OLT 231(1). Optical fiber link 2960(3) connects ports 2934 and 2922, such that OLT 231(3) serves as a backup OLT for OLT 231(3). Optical fiber link 2960(4) connects ports 2944 and 2932, such that OLT 231(4) serves as a backup OLT for OLT 231(3).

Figure 30:
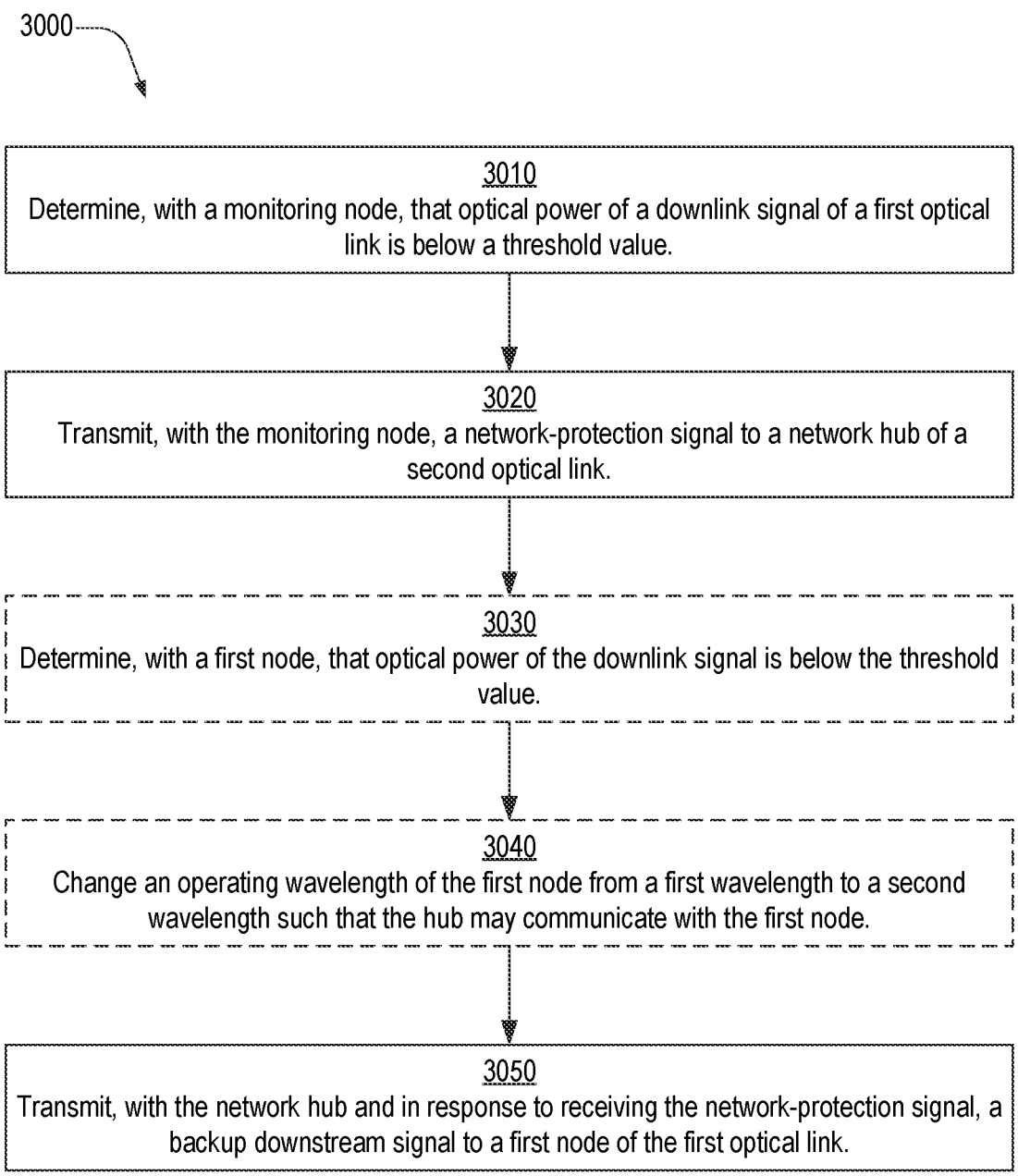
FIG. 30 is a flowchart illustrating a network protection method that may be executed by the redundancy link of FIG. 23, in an embodiment.

FIG. 30 is a flowchart illustrating a network protection method 3000, which may be executed by redundancy link 2300 of FIG. 23, in an embodiment. Method 3000 includes steps 3010, 3020, and 3050. Method 3000 may also include at least one of steps 3030 and 3040.

Step 3010 includes determining, with a monitoring node, that optical power of a downlink signal of a first optical link is below a threshold value. Optical links 240(1) and 240(2) are examples of the first and second optical links, respectively. In a first example of step 3010, the monitoring node is an ONU 270(1), which determines that the optical power of signal 281(1) is below a threshold value. In a second example of step 3010, the monitoring node is an ONU 270(2), which determines that the optical power of signal 282(1) is below a threshold value.

Step 3020 includes transmitting, with the monitoring node, a network-protection signal to a network hub of a second optical link. In a first example of step 3020, the monitoring node is one of ONUs 270(1), which transmits network-protection signal 285(2) to OLT 231(2), which is the network protection connected hub in this example. In this first example, the network-protection signal has a wavelength equal to the first wavelength, and the monitoring node is part of the first optical link. In a second example of step 3020, the monitoring node is one of ONUs 270(2), which transmits network-protection signal 284(2) to OLT 231(2), which is the network protection connected hub in this example. In this second example, the network-protection signal has a wavelength equal to the second wavelength, and the monitoring node is part of the second optical network Step 3050 includes transmitting, with the network optical hub and in response to receiving the network-protection signal, a backup downstream signal to a first node of the first optical link. In an example of step 3050, OLT 231(2) transmits backup downstream signal 286(2) to at least one ONU 270(1).

Method 3000 may include step 3030 when the carrier wavelengths of the downlink signal and the backup downstream signal equal a first wavelength and a second wavelength, respectively. Step 3030 occurs before step 3050, and includes determining, with the first node, that optical power of the downlink signal is below the threshold value. In an example of step 3030, an ONU 270(1) determines that the optical power of signal 281(1) is below a threshold value.

Step 3040 includes changing an operating wavelength of the first node from a first wavelength to a second wavelength such that the second hub may communicate with the first node. In an example of step 3040, at least one ONU 270(1) changes its operating wavelength from wavelength $\lambda_1$ to wavelength $\lambda_2$.

When the first node, introduced in step 3050, is the same as the monitoring node of step 3010, and when the downlink signal and the backup downstream signal have different wavelengths, steps 3010 and 3030 are identical. An example of such a scenario is when the downlink signal is downstream signal 280(1) and an ONU 270(1) is both the monitoring node and the first node. In this scenario, when the monitoring node executes step 3010, step 3030 is also executed, and the downlink signal's optical power need only be determined once.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated, the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. A redundancy link comprising:
    a first optical splitter including (i) a first hub-side port that optically couples to a first optical line terminal, (ii) a first hub-side failover-mode port, (iii) a first plurality of node-side splitter-ports each optically coupled to the first hub-side port and the first hub-side failover-mode port, and (iv) a first failover-mode port that is coupled to the first hub-side port and distinct from the first hub-side failover-mode port; and
    a second optical splitter including (i) a second hub-side port that optically couples to a second optical line terminal, (ii) a second hub-side failover-mode port optically coupled to the first failover-mode port, (iii) a second plurality of node-side splitter-ports each optically coupled to the second hub-side port and the second hub-side failover-mode port, and (iv) a second failover-mode port that is coupled to the second hub-side port and distinct from the second hub-side failover-mode port.

2. The redundancy link of claim 1, further comprising a first protection optical-fiber link coupled between the first hub-side failover-mode port and the second failover-mode port.

3. The redundancy link of claim 2, further comprising a second protection optical-fiber link coupled between the second hub-side failover-mode port and the first failover-mode port.

4. The redundancy link of claim 1, further comprising the first optical line terminal operating at a first wavelength.

5. The redundancy link of claim 4, further comprising the second optical line terminal operating at a second wavelength that differs from the first wavelength.

6. A redundancy link comprising:
    a first fiber-optic component including (i) a first hub-side port that optically couples to a first optical line terminal, (ii) a first hub-side failover-mode port, (iii) a first node-side failover-mode port optically coupled to each of the first hub-side port and the first hub-side failover-mode port; and (iv) a first node-side port optically coupled to each of the first hub-side port and the first hub-side failover-mode port; and a second fiber-optic component including (i) a second hub-side port that optically couples to a second optical line terminal, (ii) a second hub-side failover-mode port optically coupled to the first node-side failover-mode port, (iii) a second node-side failover-mode port optically coupled to the first hub-side failover-mode port, the second hub-side port, and the second hub-side failover-mode port, and (iv) a second node-side port optically coupled to each of the second hub-side port and the second hub-side failover-mode port.

7. The redundancy link of claim 6,
the first fiber-optic component being a passive optical splitter, wherein the first node-side failover-mode port and the first node-side port is fixedly coupled to each of the first hub-side port and the first hub-side failover-mode port.

8. The redundancy link of claim 7,
the second fiber-optic component being a passive optical splitter, wherein the second node-side failover-mode port and the second node-side port is fixedly coupled to each of the second hub-side port and the second hub-side failover-mode port.

9. The redundancy link of claim 6, wherein:
the first fiber-optic component being an optical switch, the first node-side failover-mode port and the first node-side port is switchably coupled to each of the first hub-side port and the first hub-side failover-mode port; and
the second fiber-optic component being an optical switch, the second node-side failover-mode port and the second node-side port is switchably coupled to each of the second hub-side port and the second hub-side failover-mode port.

10. The redundancy link of claim 6, further comprising an optical fiber optically coupling the first hub-side failover-mode port to the second node-side failover-mode port.

11. The redundancy link of claim 10, further comprising an additional optical fiber optically coupling the second hub-side failover-mode port to the first node-side failover-mode port.

12. An optical network comprising: the redundancy link of claim 6, wherein the first optical line terminal being optically is coupled to the first hub-side port, and the second optical line terminal is optically coupled to the second hub-side port.

13. An optical network comprising:
the redundancy link of claim 6; and wherein
a first node-side optical splitter includes a first plurality of node-side splitter-ports and a first hub-side splitter-port optically coupled to the first node-side port and to each of the first plurality of node-side splitter-ports.

14. The optical network of claim 13, further comprising an optical fiber optically coupling the first node-side port to the first hub-side splitter-port.

15. The optical network of claim 13, further comprising:
a second node-side optical splitter including a second plurality of node-side splitter-ports and a second hub-side splitter-port optically coupled to the second node-side port and to each of the second plurality of node-side splitter-ports.

16. The optical network of claim 15, further comprising an optical fiber optically coupling the second node-side port to the second hub-side splitter-port.

17. A network protection method, comprising:
determining, with a monitoring node, that optical power of a downlink signal of a first optical link is below a threshold value;
transmitting, with the monitoring node and via a first protection optical-fiber link, a network-protection signal to a network hub of a second optical link; and
transmitting, with the network hub and in response to receiving the network-protection signal, a backup downstream signal to a first node of the first optical link;
the first protection optical-fiber link being part of a redundancy link that includes:
a first optical splitter including (i) a first hub-side port that optically couples to a first optical line terminal, (ii) a first hub-side failover-mode port, (iii) a first plurality of node-side splitter-ports each optically coupled to the first hub-side port and the first hub-side failover-mode port, and (iv) a first failover-mode port that is coupled to the first hub-side port and distinct from the first hub-side failover-mode port; and
a second optical splitter including (i) a second hub-side port that optically couples to a second optical line terminal, (ii) a second hub-side failover-mode port optically coupled to the first failover-mode port, (iii) a second plurality of node-side splitter-ports each optically coupled to the second hub-side port and the second hub-side failover-mode port, and (iv) a second failover-mode port that is coupled to the second hub-side port and distinct from the second hub-side failover-mode port,
wherein the first protection optical-fiber link is coupled between the first hub-side failover-mode port and the second failover-mode port.

18. The network protection method of claim 17, the downlink signal and the backup downstream signal having a respective first wavelength and a second wavelength, and further comprising, before transmitting the backup downstream signal:
determining, with the first node, that optical power of the downlink signal is below the threshold value.

19. The network protection method of claim 18, further comprising:
changing an operating wavelength of the first node from the first wavelength to the second wavelength such that the network hub may communicate with the first node.

20. The network protection method of claim 17, the downlink signal and the backup downstream signal having a respective first wavelength and a second wavelength and, in said step of transmitting the network-protection signal, the network-protection signal having a wavelength equal to the second wavelength.

21. The network protection method of claim 17, the monitoring node and the second optical link being part of a same optical network.

22. The network protection method of claim 17, the downlink signal and the backup downstream signal having a respective first wavelength and a second wavelength and, in said step of transmitting the network-protection signal, the network-protection signal having a wavelength equal to the first wavelength.

23. The network protection method of claim 17, the monitoring node and the first optical link being part of a same optical network.

\* \* \* \* \*